(12) United States Patent
Carter et al.

(10) Patent No.: US 9,509,176 B2
(45) Date of Patent: Nov. 29, 2016

(54) ENERGY STORAGE MODELING AND CONTROL

(71) Applicant: IHI INC., New York, NY (US)

(72) Inventors: W. Craig Carter, Jamaica Plain, MA (US); Marco Ferrara, Boston, MA (US); Michael Goroff, Brookline, MA (US); Maxwell Mann, Cambridge, MA (US)

(73) Assignee: IHI INC., New York, NY (US)

( * ) Notice: Subject to any disclaimer, the term of this patent is extended or adjusted under 35 U.S.C. 154(b) by 369 days.

(21) Appl. No.: 13/838,014

(22) Filed: Mar. 15, 2013

(65) Prior Publication Data

US 2014/0039710 A1    Feb. 6, 2014

Related U.S. Application Data

(60) Provisional application No. 61/620,206, filed on Apr. 4, 2012.

(51) Int. Cl.
| | |
|---|---|
| G05B 13/04 | (2006.01) |
| G05F 1/67 | (2006.01) |
| G06Q 10/04 | (2012.01) |
| H02J 3/00 | (2006.01) |
| H02J 15/00 | (2006.01) |
| G06Q 10/06 | (2012.01) |

(52) U.S. Cl.
CPC ............ *H02J 15/00* (2013.01); *G05B 13/041* (2013.01); *G05F 1/67* (2013.01); *G06Q 10/06* (2013.01); *H02J 3/00* (2013.01); *Y02E 40/76* (2013.01); *Y04S 10/545* (2013.01)

(58) Field of Classification Search
CPC ................ G06Q 10/06; G06Q 10/04; G06Q 10/06312; G06Q 30/0206; G06Q 30/0283; G05B 13/041; G05F 1/67; H02J 3/00; H02J 15/00; Y02E 40/76; Y04S 10/545
USPC .......................................................... 700/291
See application file for complete search history.

(56) References Cited

U.S. PATENT DOCUMENTS

| 8,145,362 | B2 | 3/2012 | Weir et al. |
| 9,335,747 | B2 * | 5/2016 | Steven ................ G06Q 10/00 |
| 2011/0231028 | A1 | 9/2011 | Ozog et al. |

(Continued)

OTHER PUBLICATIONS

Xi, et al., "A Stochastic Dynamic Programming Model for Co-optimization of Distributed Energy Storage," Management Science, printed Sep. 26, 2013, 20 pages.

(Continued)

*Primary Examiner* — Robert Fennema
*Assistant Examiner* — Jennifer L Norton
(74) *Attorney, Agent, or Firm* — Amster, Rothstein & Ebenstein LLP

(57) ABSTRACT

Systems and methods for optimal planning and real-time control of energy storage systems for multiple simultaneous applications are provided. Energy storage applications can be analyzed for relevant metrics such as profitability and impact on the functionality of the electric grid, subject to system-wide and energy storage hardware constraints. The optimal amount of storage capacity and the optimal operating strategy can then be derived for each application and be prioritized according to a dispatch stack, which can be statically or dynamically updated according to data forecasts. Embodiments can consist of both planning tools and real-time control algorithms.

15 Claims, 26 Drawing Sheets

(56) References Cited

U.S. PATENT DOCUMENTS

| | | | |
|---|---|---|---|
| 2012/0053750 A1 | 3/2012 | Viassolo | |
| 2012/0065805 A1 | 3/2012 | Montalvo | |
| 2012/0133337 A1* | 5/2012 | Rombouts et al. | 320/155 |
| 2013/0261823 A1* | 10/2013 | Krok | G05F 5/00 700/291 |
| 2014/0350743 A1* | 11/2014 | Asghari | G05B 13/048 700/297 |

OTHER PUBLICATIONS

Bathurst, et al., "Value of combining energy storage and wind in short-term energy and balancing markets," Electric Power Systems Research, Elsevier, Jan. 2003, 8 pages.

Black, et al., "Value of Bulk Energy Storage for Managing Wind Power Fluctuations," IEEE Transactions on Energy Conversion, vol. 22, No. 1, Mar. 2007, 9 pages.

Mercier, et al., "Optimizing a Battery Energy Storage System for Frequency Control Application in an Isolated Power System," IEEE Transactions on Energy Conversion, vol. 24, No. 3, Aug. 2009, 9 pages.

Celli, et al., "Optimal Integration of Energy Storage in Distribution Networks," IEEE Bucharest Power Tech Conference, Jun. 2009, 7 pages.

Lo, et al., "Economic Dispatch and Optimal Sizing of Battery Energy Storage Systems in Utility Load-Leveling Operations," IEEE Transactions on Energy Conversion, vol. 14, No. 3, Sep. 1999, 6 pages.

Oudalov, et al., "Value Analysis of Battery Energy Storage Applications in Power Systems," IEEE, 2006, 6 pages.

Tuohy, et al., "Unit Commitment for Systems With Significant Wind Penetration," IEEE Transactions on Power Systems, vol. 24, No. 2, May 2009, 10 pages.

Leou, et al., "An Economic Analysis Model for the Energy Storage Systems in a Deregulated Market," IEEE, 2008, 6 pages.

Kingston, et al., Exploring Distributed Energy Alternatives to Electrical Distribution Grid Expansion, Southern California Energy Program Report, Dec. 2005, 113 pages.

International Search Report issued for International Application No. PCT/US2013/035270 mailed Aug. 2, 2013, 3 pages.

Teleke, et al., "Control Strategies for Battery Energy Storage for Wind Farm Dispatching," IEEE Transactions on Energy Conversion, vol. 24, No. 3, Sep. 2009, 8 pages.

Teleke, et al., "Optimal Control of Battery Energy Storage for Wind Farm Dispatching," IEEE Transactions on Energy Conversion, vol. 25, No. 3, Sep. 2010, 8 pages.

Teleke, et al., Rule-Based Control of Battery Energy Storage for Dispatching Intermittent Renewable Sources, IEEE Transactions on Sustainable Energy, vol. 1, No. 3, Oct. 2010, 8 pages.

Tanabe, et al., "Generation Scheduling for Wind Power Generation by Storage Battery System and Meteorological Forecast," IEEE, 2008, 7 pages.

* cited by examiner $$SOCDesired = SOCCurrent + (PowerForecast - PowerCommitted) \times \frac{FlatTime}{SOCUrgency}$$

Fig. 3

ENERGY STORAGE MODELING AND CONTROL

CROSS-REFERENCE TO RELATED APPLICATIONS

This application claims priority to U.S. Provisional Application Ser. No. 61/620,206, entitled "Energy Storage Modeling and Control," filed on Apr. 4, 2012, which is incorporated herein by reference in its entirety.

BACKGROUND

It is generally recognized that the installation and use of an energy storage system (an "ESS") on an electrical grid can result in material benefits (operational, financial, environmental, etc.) to grid participants and/or stakeholders, and by doing so can generate material financial returns to an entity owning or controlling the energy storage assets. Energy storage techniques can generate these kinds of benefits through a range of potential applications ("ES applications"), such as (i) the provision of certain ancillary services for which there are established energy or capacity market mechanisms (e.g. frequency regulation, spinning reserves, black start capacity), (ii) load shifting or peak shaving, (iii) deferral or avoidance of otherwise necessary transmission or distribution upgrades, (iv) relief of transmission or distribution bottlenecks or other constraints, (v) integration of intermittent renewable generation, whether through smoothing, ramping services, the provision of shaped power or otherwise, (vi) hybridization of generation assets to increase fuel efficiency or reduce carbon emissions, (vii) provision of backup power or uninterruptable power system ("UPS") during islanded operation, (viii) time shifting of energy purchases and sales for cost saving or arbitrage purposes, (ix) provision (or committed availability to provide) various operating reserves, and (x) provision of power, energy or services that might otherwise be provided by a natural gas peaking plant or other power generation sources. The foregoing is intended to be a representative listing of ES applications, and not an exhaustive listing. In many cases a single ESS installed in a specific location can provide multiple ES applications (sometimes referred to as the stacking of applications). As used herein, references to a single ES application may include a combination or stacking of multiple ES applications.

The existence and extent of the benefits and/or related financial returns from a specific installation and use of an ESS can be dependent on a broad range of factors. These factors include the cost of the ESS (which is generally measured in terms of $/kW and/or $/kWh), the ESS's ratio of power to energy, the size of the ESS (in kW or kWh), the round trip efficiency of the ESS, the cycle life and/or useful life of the ESS, the manner in which acquisition of the ESS is financed, the site and installation costs of the ESS, the ongoing operating and maintenance costs of the ESS. Additional factors can also relate to the location of the ESS installation and the ES application(s) for which it is used. These factors can include energy prices and other market conditions, the specific grid conditions giving rise to a need for the ES application, the pricing/compensation/tariffs or other incentives available for the product or service provided by the ES application, the reliability of forecasts of available power, and the mix of generation assets serving the geographic (or the collection of electrical connections to an ESS) area that includes the ESS.

A number of studies and simple models exist which each provide a degree of guidance regarding potential ES applications, the basic types of ESS technologies that may be appropriate for the ES applications, potential market sizes, and maximum ESS costs for the use of an ESS to be economical. These studies and models can be useful in providing overall insight into future markets and the appropriateness of current or future energy storage technologies to address certain needs or opportunities on the grid. The studies, however, do not provide specific insight as to the appropriate specifications for an ESS providing a particular ES application at a particular location. Likewise, the studies do not provide specific insight into exactly how such ESS would be operated and used for the ES application at such location. Furthermore, they do not couple operating mode to the economic metrics that inform the optimal appropriate energy and power characteristics of an ESS purchase.

In the absence of these insights, the existing studies and models are ineffective with respect to demonstrating whether or not installation and use of an appropriate ESS in a particular location to perform a particular ES application will, if operated in an appropriate manner, be attractive or even feasible from a financial perspective. Given that the existing studies and models are ineffective in this way they are not useful as a planning tool for grid participants, planners or regulators. In this sense there is a gap in the analytic tools available with respect to energy storage for the grid.

SUMMARY

Embodiments of the disclosed subject matter can relate to a general methodology for optimal planning of energy storage assets for fulfilling simultaneous applications. Embodiments of the disclosed subject matter can also relate to real-time control algorithms that can implement the general methodology to manage energy storage assets fulfilling simultaneous applications in a way that maximizes asset revenues and profitability.

In general, in an aspect, embodiments of the disclosed subject matter can provide a tangible computer readable medium encoded with computer-executable instructions that, when executed by a computer or another operation agent, cause the computer to receive input parameters including historical data relating to factors that influence the operation of an energy storage system, a physical model of the energy storage system, a physical model of other systems to which the energy storage system is connected, pricing information relating to possible revenue from the energy storage system, a possible energy storage system configuration, a possible energy storage system operating strategy, an energy-supply forecast, and an energy storage system cost model, and calculate an optimal energy storage system operating strategy using the input parameters, output an optimal energy storage system capacity and specification based on the calculated energy storage system operating strategy, and execute the energy storage system operating strategy in a real-time control system Embodiments of the disclosed subject matter can include a number of modeling applications, which allow a user to input (i) historic or projected data regarding operating and market conditions at a specific location over a period of time, (ii) specific data on the ES application and the needs/opportunities to be addressed by the ES application, including specific information on tariff schemes and/or other financial incentives, (iii) specifications and operating characteristics for an ESS that will provide this ES application at that location, and energy-supply forecasts. In some embodiments, the modeling applications are highly sophisticated, the historic or projected data is highly granular, and the specifications and/or operating characteristics can be highly complete or full, but such characteristics are not required. Embodiments of the disclosed subject matter can also demonstrate the operation of the ESS on a concurrent basis over the course of the time period for which an ESS is available to the grid (e.g., specifying whether at any given moment the ESS is charging or discharging, and at what rate, or doing neither) and can calculate, or predict, the financial results of the installation of this ESS and this operation of it. Embodiments of the disclosed subject matter can also engage in various optimization exercises using its ability to demonstrate moment-to-moment ESS operation, and the related financial results. It should be noted that embodiments of the present disclosed subject matter can equally apply to a large number of ESS technologies such as electrochemical batteries, electrical capacitors, superconducting magnetic rings, mechanical flywheels, compressed air energy storage (CAGS), hydrostatic, etc. Embodiments can also treat a portfolio of ESS assets.

An example of an optimization exercise is a strategy for operating an ESS. Underlying the operation of the ESS for a specific ES application is an operating strategy (an "ES operating strategy") that seeks to use the ESS to provide an ES application in manner that is cost efficient and operationally effective. It can be such as an ES operating strategy that determines the activity of the ESS (e.g., charging, discharging or neither) at each given moment. Embodiments of the disclosed subject matter can allow for an ES operating strategy to be input, and/or can provide for an ES operating strategy to be derived and refined. Such an optimal ES operating strategy can be found from the examination of large sets of scenarios and results reflecting minor alterations of a given ES operating strategy with help of well-known mathematical instruments, such as Monte Carlo optimization and machine learning techniques.

Another example of an optimization exercise is the specifications of the ESS. These specifications can relate to the characteristics of the energy storage provided by the ESS (e.g., a ratio of power to energy, round trip efficiency, cycle and calendar life, maintenance requirements, etc.) and the quantity of energy storage provided by the ESS. The operational and financial benefits that can be generated by an ESS, and the costs of installing and operating an ESS, can be a function of both the characteristics and the quantity of the energy storage provided by the ESS. Embodiments of the disclosed subject matter can derive optimal ESS characteristics and quantity by examining the total and marginal cost of these and the total and marginal operational and financial benefits generated by ESS, in each case based upon installation and operation the ESS to provide a specific ES application at a specific location in accordance with a specific ES operating strategy. Changes with respect to the ES application, the installation location (and any related conditions), and/or the ES operating strategy can result in changes to the optimal characteristics and/or quantity of the energy storage of the ESS.

Many of the factors/inputs relevant to the calculations, demonstrations and optimizations provided by certain embodiments of the disclosed subject matter can be highly variable over long time frames and/or over very short time frames, and in any event are typically uncertain. These can include factors/inputs such as wholesale energy prices, natural gas prices, ancillary services prices, loads, and weather conditions effecting loads, energy output from wind farms or solar plants, interest rates and other factors impacting financing costs, etc. Embodiments of the disclosed subject matter can demonstrate operation of an ESS with all control decisions being made without the benefit of any data that would be unknown or uncertain if these control decisions were being made in real time. Each ES operating strategy can be developed, tested and refined on this basis, primarily using means such as statistical calculations, Monte Carlo analysis and machine learning techniques. Embodiments of the disclosed subject matter can assume tolerance levels for non-performance by the ESS with respect to ES applications given that the control decisions generated can be based on probabilities rather than certainties. Embodiments of the disclosed subject matter can measure and take into account the costs of such non-performance, and can also allow for adjustment the tolerance of non-performance. Embodiments can allow for periodic or concurrent operating algorithm improvements based on historical information derived from in-use behavior of ESS control strategies, changes in the grid connectivity, demand, and the availability of new power sources.

Assuming the use of adequate data processing hardware, embodiments of the disclosed subject matter can make calculations and can generate control decisions in real time, e.g., at a speed such that the ESS can be controlled using data generated and input on an ongoing basis right up until the point immediately prior to the generation of the control decision. The process of acquiring data and other inputs and generating control decisions can occur continuously, in intervals that are, for example, as short as the shortest interval in the acquired data. Thus, for example, if a controller is determining a control decision in part on the basis of a load measured and delivered in 30 second intervals (in addition to many other inputs and factors), then the controller can generate control decisions in increments 30 seconds to one hour, immediately upon the receipt of the 30 second load data. Embodiments of the disclosed subject matter can also demonstrate how an arbitrary number of simultaneous ES applications can be addressed with dynamic, real-time scheduling. Longer term future strategies that are dynamically updated at shorter intervals.

Embodiments of the disclosed subject matter can have several different potential uses. For example, the techniques described herein can be used by prospective purchases/users of energy storage to evaluate whether and where an installation and use of energy storage will be financially attractive. The techniques can also be used to test and demonstrate the impact that such an installation and use will have on grid conditions and/or grid stability, which would be of use to system operators and/or others responsible for grid stability. In each case the techniques may be used to do so on the basis of optimal operation of an ESS that is optimal in terms of its characteristics and quantity (or, if desired, of an ESS having other specified characteristics and quantity). Embodiments of the disclosed subject matter may, with respect to any of the foregoing, demonstrate and calculate how results or outcomes would change with changes to key inputs, such as changes to the cost of energy, energy storage or ancillary services, or changes to relevant regulatory or market structures, or changes in generation and/or load characteristics. Embodiments of the disclosed subject matter can also be used by developers of energy storage and ESS's to determine the set of ESS characteristics that will be most valuable and effective for a given ES application. The disclosed subject matter should be useful for regulators and/or system operators to evaluate whether and how changes to tariffs, energy or capacity markets, or regulations will impact the installation and use of energy storage to address specific grid issues or challenges. In addition, embodiments can utilize extant ESS to inform economic and operational decisions regarding the purchase and impact of additional energy-generation resources or additional ESSs.

Embodiments of the disclosed subject matter can also serve as a controller incorporated into an ESS or installed in connection with an ESS, which can dispatch the ESS, e.g., on a moment-to-moment basis in real time, allocating storage capacity across available applications and directing the ESS to charge or discharge, and at what rates; or to be held in abeyance for future sources of energy or storage of excess energy. The manner in which the ESS is controlled can be adjusted based on, for example, desired financial or other outcomes, and/or to reflect changes in relevant rules or conditions. The controller can dispatch the ESS on the basis of operating and market data provided to the controller on a real time basis.

These and other capabilities of the disclosed subject matter, along with the invention itself, will be more fully understood after a review of the following figures, detailed description, and claims.

BRIEF DESCRIPTION OF THE DRAWINGS

The description below refers to the accompanying drawings, of which:

FIG. 3 is the mathematical formulation of one embodiment of an operation strategy for wind power regulation.

DETAILED DESCRIPTION

Embodiments of the disclosed subject matter can provide techniques for providing an ES application optimization tool that includes a set of modeling tools implementing a general methodology for determining the optimal ESS capacity and characteristics where the financial worth or other combinations of figures of merit of the ESS asset is maximized. For example, the tool can solve for the point (e.g., battery characteristics and operating strategy) where marginal cost equals marginal revenues for a specific ES application as a function of ESS capacity or characteristics. The resulting ESS capacity is the optimal capacity to allocate to the ES application. Embodiments of the disclosed subject matter can also provide real-time control algorithms that can manage energy storage assets fulfilling simultaneous applications in a way that maximizes asset revenues and profitability. Other embodiments are within the scope of the invention.

Figure 1:
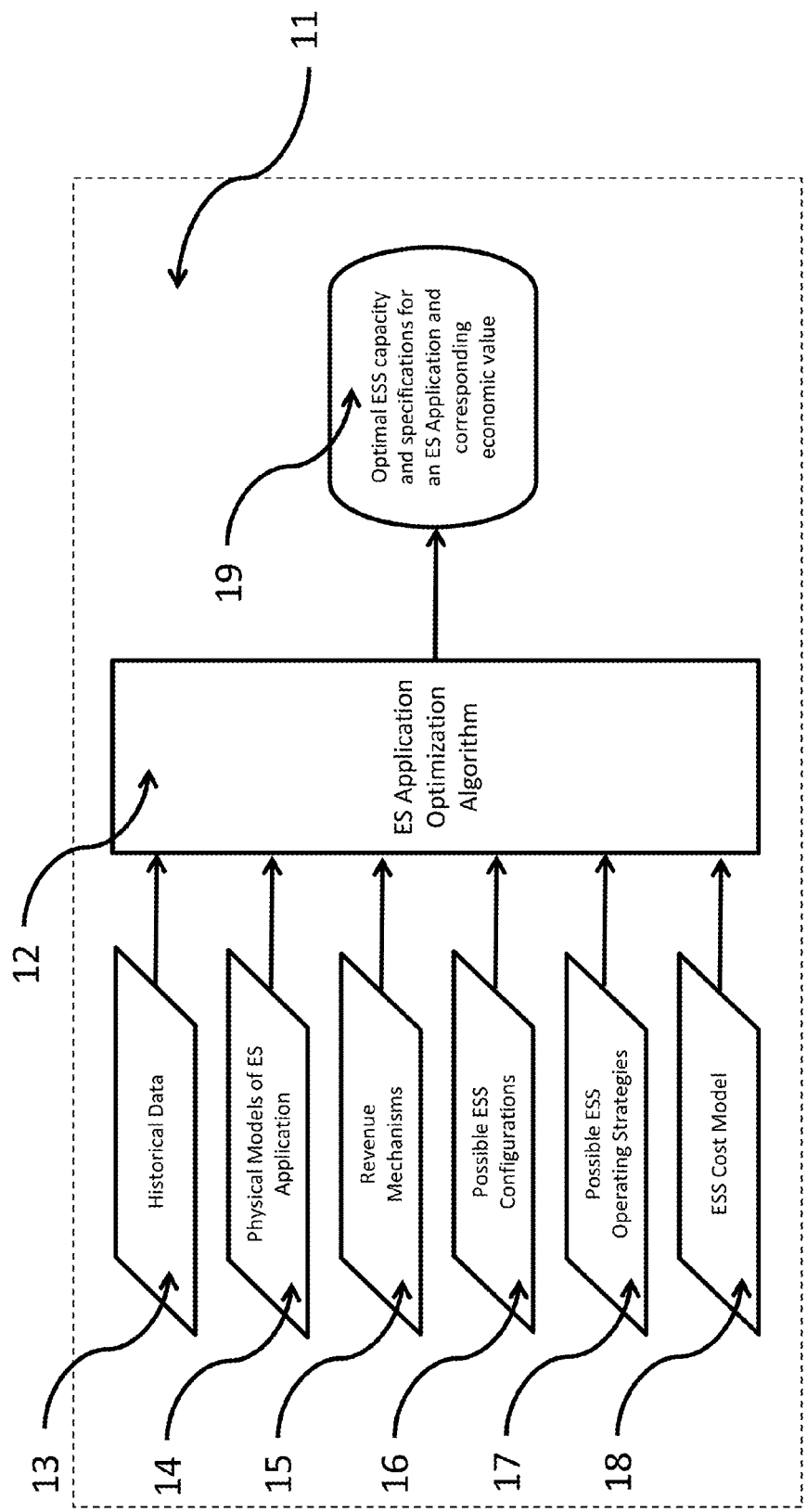
FIG. 1 is an exemplary schematic of an ES application optimization tool.

FIG. 1 shows the general components of ES application optimization tool 11, although the ES application optimization tool 11 can include more or fewer components. Historical data 13 can relate to quantifiable factors that can have an effect on the overall operation of an energy storage system, such as market data, weather data and forecasts, econometric indicators, calendars etc. Historical data 13 can be obtained from proprietary sources, such as data acquisition systems connected to renewable generation assets and from public sources such as independent system operators databases. Physical models of ES application 14 can relate to the mathematical model of ES application, both pertaining to ESS, such as chemical, electrical, mechanical and thermodynamic equations, and pertaining to other components, such as chemical, electrical, mechanical and thermodynamic equations of power equipment. Physical models of ES application 14 can be obtained from specialized literature, such as scientific journals and engineering textbooks, as well as from proprietary sources, such as user manuals. Revenue mechanisms 15 can relate to revenue opportunities captured by deploying ESS for ES applications such as ancillary services, price arbitrage, peak shaving, voltage regulation, etc. Possible ESS configurations 16 can relate to ESS capacity, power rating, charge and discharge rates, useful life, efficiency losses, etc. Revenue mechanisms 15 can be obtained from publicly available documentation on regulated tariff/penalty schemes in power markets as well as from proprietary models involving, by means of example, power trades.

Possible ESS operating strategies 17 can relate to dispatch rules complying with external as well as internal conditions and aiming at maximizing ESS operating life and financial worth. Possible ESS operating strategies 17 can be obtained from ESS hardware specifications. By way of example, possible ESS operating strategies can regulate when the ESS is discharged and charged in response to exogenous inputs and endogenous ESS conditions. ESS operating strategies can also impose constraints such as the extent to which ESS available capacity is perused during charging and discharging or the rate of charging and discharging. ESS cost model 18 can refer to proprietary cost models relating ESS capacity and characteristics to capital and operating cost of the ESS asset. ESS cost model 18 can be obtained from ESS hardware specifications. By way of example, ESS hardware could be specified in terms of rated energy, rated power, time duration of charge and discharge, number of cycles, and the effect of charge and discharge rates on ESS wear, all of which can contribute to the cost of ESS hardware.

ES application optimization algorithm 12 can perform a minimal set of asset simulations converging to the optimal ESS capacity and characteristics for the selected application, which are expressed in output 19. For example, one output of the tool can consist of the optimal battery capacity and the financial worth of the same in the selected ES application. ES application optimization algorithm 12 can incorporate the rules and constraints in possible ESS operating strategies 17. Thus, for example, the ES application optimization algorithm can calculate the correct amount of storage and ESS power and fine tune the operating strategy to achieve a desired amount of storage.

For example, the ES application optimization algorithm 12 can consist of applying a specified operation strategy to the operating conditions of a specific application to produce a financial result for each ESS capacity (MWh) and power (MW) capability. With a matrix of financial results spanning a large space of capacity and power characteristics, the optimum ESS system can be located by visual inspection, regression fitting to a function with a maximum, or application of other standard multivariate optimization methods.

Figure 2:
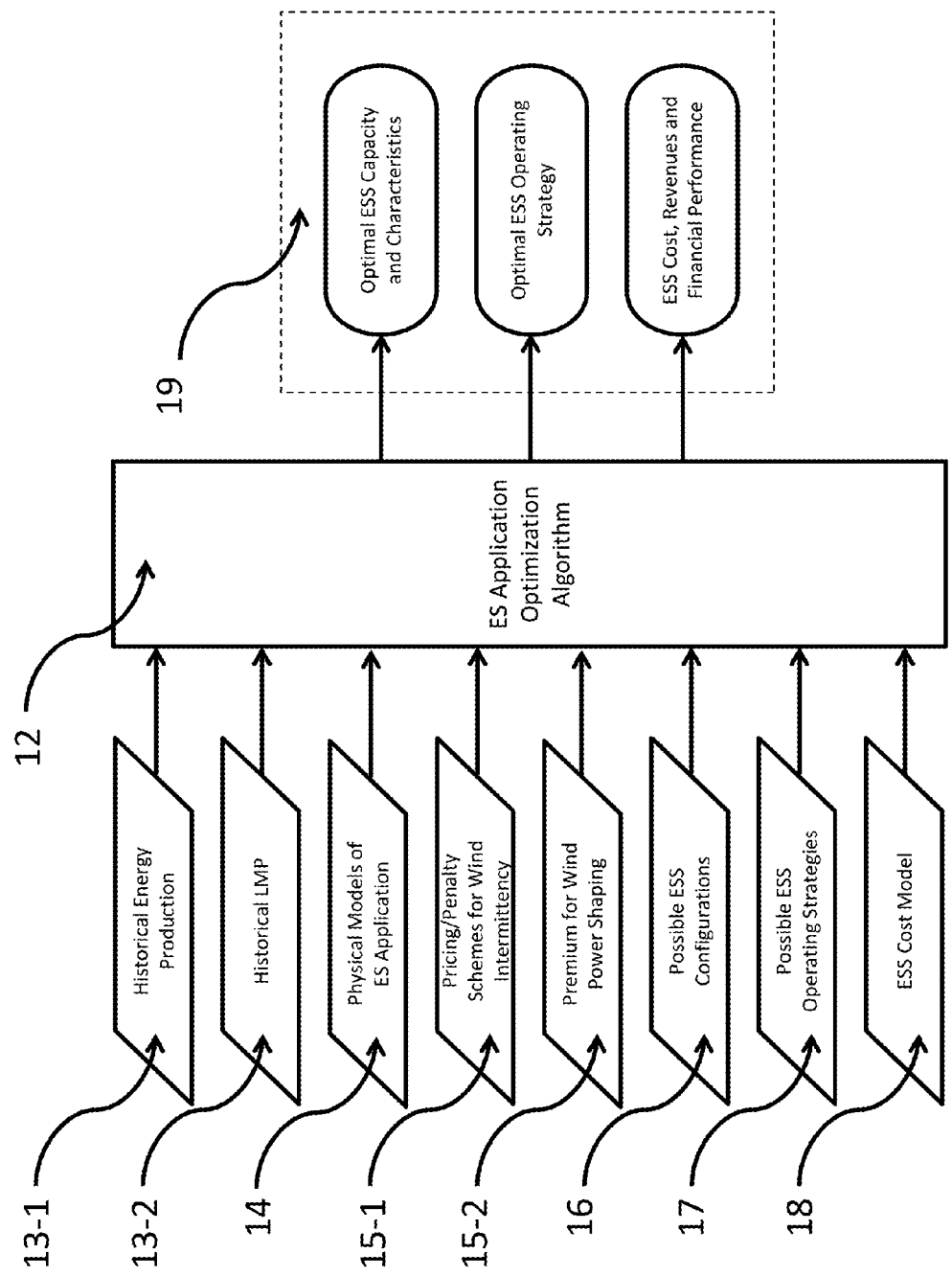
FIG. 2 is an exemplary schematic of one embodiment of an ES application optimization tool for wind power regulation.

By way of example, FIG. 2 illustrates an embodiment in a model that demonstrates the operation of an ESS installed for the purposes of altering the energy production of a wind farm so as to minimize costs/penalties resulting from the intermittency of wind power. This model adopts the perspective of a wind farm owner selling on a merchant basis the energy it produces. This model uses the following inputs, amongst others (although other inputs can be used):

a. Historic energy production 13-1, in 30 second intervals, of an actual wind farm over multi-month periods;
b. Historic LMP (Locational Marginal Pricing) 13-2 applicable to that wind farm for the periods covered by the production data;
c. Physical models of ES application 14;
d. Pricing/penalty schemes for wind intermittency 15-1 aimed at internalizing the costs incurred as a result of wind intermittency, particularly those costs associated with imbalances between energy scheduled/committed to be provided by the wind farm to the grid and the energy actually provided by the wind farm to the grid;
e. Premium for wind power shaping 15-2 aimed at creating an incentive for wind power producer to supply in flat power blocks, or other time-dependent power feeds;
f. Possible ESS configurations 16 relating to ESS capacity, power rating, charge and discharge rates, useful life, efficiency losses and other characteristics;
g. Possible ESS operating strategy 17 relating to the operating strategy in conjunction with the wind farm so that the energy delivered to the grid by the combination of the wind farm and the ESS consists of flat blocks (or power ramps) of energy (e.g. one hour of constant power, or time-dependent power increase or decrease) committed to in advance (e.g. 20 minutes in advance of the hour);
h. ESS cost model 18 relating to a separate proprietary model, and other relevant information, indicating the relative and absolute cost of ESS's having different technologically feasible characteristics (e.g. with respect to power, energy, cycle life, footprint, efficiency, etc.).

By way of example, FIG. 3 shows ESS operating strategy 17 in one embodiment employed for power regulation, which can consist of iterating through each time step, applying constraints and commitments, and committing enough power PowerCommitted to the next time block to bring current state of charge SOCCurrent plus forecast incoming power PowerForecast for the time period back to the desired state of charge SOCDesired, within time period FlatTime scaled by state of charge urgency SOCUrgency. For example, suppose that the ESS contains 2 MWh and has commitments totaling 1 MWh for the next two hours before the next commitment. During this period, suppose a total of 0.5 MWh of wind. So at the beginning of the next commitment period, the ESS is expected to have 1.5 MWh. If the desired state of charge is 1 MWh and the state of charge urgency is 1, the next committed action can be to discharge 0.5 MWh during the next block. ESS charging and discharging actions can scale with commitment interval and state of charge urgency, as it will be apparent to those skilled in the art. Additional parameters can include the time prior to commitment. All parameters can be arbitrarily changed by the user.

The model can also consider the financial impact of the wind farm, or intermittent power supply, operating in conjunction with the ESS, taking into account the costs/penalties/lost revenues avoided by the power supplier; the capital cost, useful life and efficiency losses of the ESS; and many other factors. For example, the actions of a battery can be modulated by the cost of battery operation during the simulation because the revenue of charge and discharge pair may be less than the amortized cost of owning and operating the ESS, including wear and depreciation of ESS hardware. Thus, the financial impact can operate as an integral component of ESS operation that is evaluated again at the end of a simulation to indicate the overall financial performance, which can be used for optimization and ultimately decision-making.

ES application optimization algorithm 12 can perform a series of optimization exercises to indicate the optimum ESS (in terms of power and energy), an optimum operation of this ESS in conjunction with the wind farm, and the financial results achieved (e.g., outputs 19 in FIG. 2). This optimization can be based on balancing the total and marginal costs of an ESS with the total and marginal revenues/cost savings realized through its operation, and in this way takes into account the decreasing returns to scale of an ESS. The model reflects broad sets of exogenous assumptions and inputs, but can be structured such that most of these can be varied to test and demonstrate ESS operations and benefits under a wide range of conditions.

For example, the model can compute the return on investment (ROI) or other financial metric for each of a set of strategies and ESS characteristics then choose the best strategy and ESS characteristics to achieve the greatest ROI or other financial metric. The optimum point can be located, for example, using list comparison, multivariate regression, local optimization techniques that travel up a local gradient vector, or other numerical optimization method known to those skilled in the art.

An exemplary set of outputs 19 can be a graphical and numerical representation of battery performance, a list of financial metrics including but not limited to $USD, Internal Rate of Return ("IRR"), net present value ("NPV"), and those metrics as a function of battery capacity, and the strategy used, including optimized strategy parameters.

Figure 4:
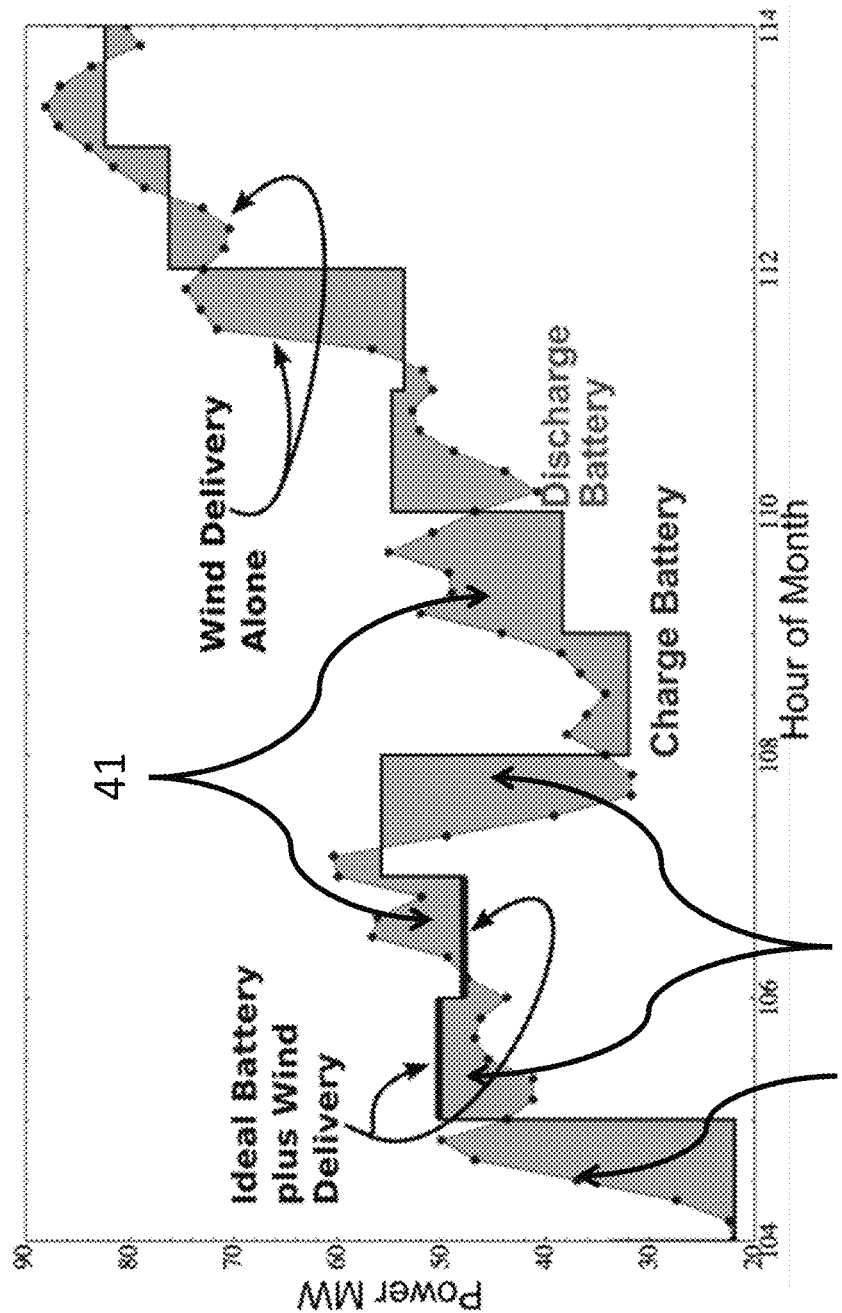
FIG. 4 illustrates an exemplary result of operating an ideal ESS for smoothing wind power variability into one-hour blocks. A system operator can incentivize the commitment and delivery of constant power in a given time interval.

FIG. 4 presents the basic operation of an ESS (with unlimited power and energy) to convert the energy production of a wind farm (black dots 43 in FIG. 4) into flat 1-hour blocks of energy. ESS charge periods 41 alternate with ESS discharge periods 42. A system operator can incentivize the commitment and delivery of constant power in a given time interval: it is therefore desirable to identify the optimal configuration of an ESS for wind power regulation.

Figure 5:
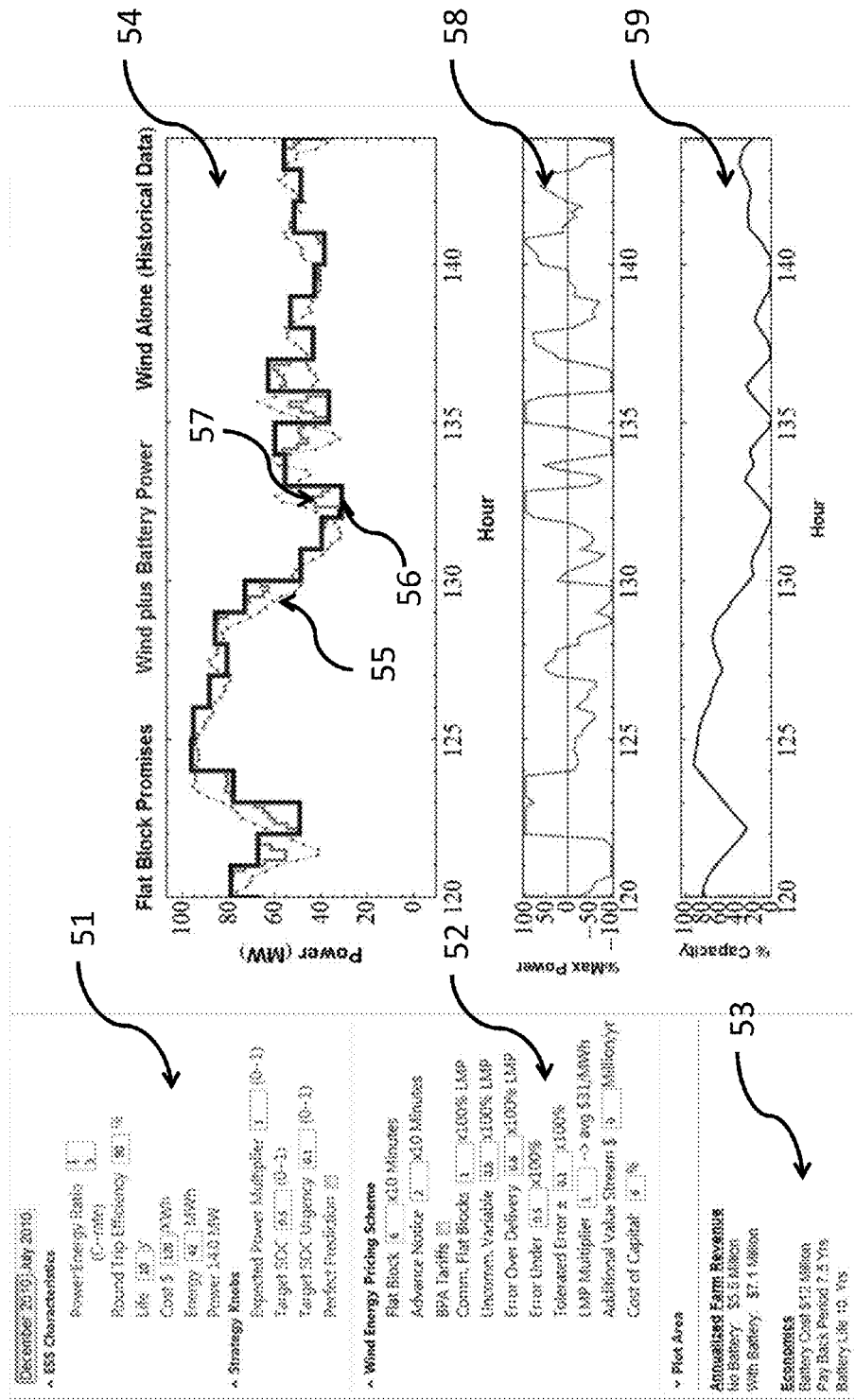
FIG. 5 shows an exemplary graphical interface of the wind power regulation optimization tool showing an embodiment of delivered power shaping produced with a battery with a given energy capacity and maximum charge and discharge rate. In this example a dynamic charging strategy is employed.

FIG. 5 shows one embodiment of the graphical interface of the wind power regulation optimization tool. In this case the behavior of a battery ESS is shown. Panels 51 and 52 set out key inputs regarding (i) the specification of the relevant ESS, (ii) "control knobs" for the strategy to be used by the ESS, and (iii) the wind energy pricing scheme pursuant to which the wind farm incurs costs/penalties due to the intermittency of its energy production. A user, evaluator, or regulatory strategist can independently vary all of these inputs. Panel 53 presents financial outputs of the model, e.g., the cost of the specified ESS, the revenues of the power supplier assuming no ESS, the revenues of the power supplier, if the specified ESS were operated with the power supplier in accordance with the strategy specified, and the payback period, IRR and NPV with respect to the investment and operation of the power supplier with ESS as presented.

Graph 54 presents the energy output of the wind farm (line 55) assuming no ESS, the commitments as to the delivery of flat blocks of power that the wind farm with the specified ESS would make (line 56), and the actual energy output of the wind farm with ESS (line 57). Because the ESS is limited as to its power and energy, wind power with ESS will not be able to fulfill all committed deliveries of flat blocks, and in those instances it will fail (referred to here as errors and seen on graph 54 as the places where the line 56 is not aligned with line 57). The use of a wind farm is purely exemplary and for illustration purposes.

Graphs 58 and 59 show the operation of the ESS at each moment to achieve the result shown in the graph 54. Graph 58 shows the action of the ESS in charging (absorbing power generated by the wind farm) and discharging (adding power to the power generated by the wind farm). Graph 59 shows the state of charge of the ESS at each moment, e.g., the amount of energy stored in the ESS at that moment relative to the full energy storage capacity of the ESS.

Figure 6:
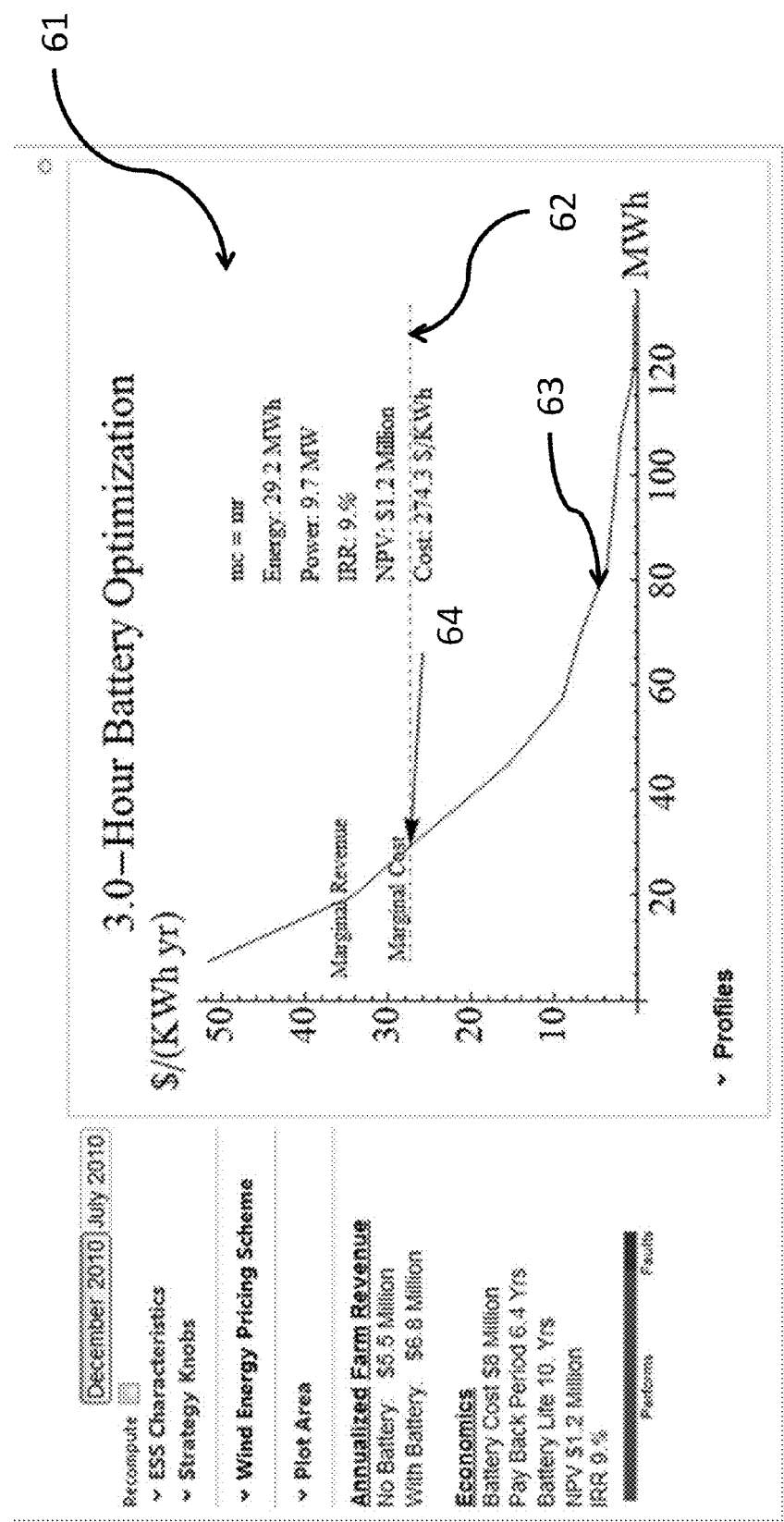
FIG. 6 shows an example of optimization of ESS capacity for wind power regulation. In this example, the optimal ESS capacity is found where marginal revenues equal marginal cost for a battery of given power to energy ratio.

FIG. 6 presents an optimization exercise with respect to the quantity of ESS, assuming a fixed power to energy ratio (which may be varied by the user) and with such optimization being on the basis of marginal costs equaling marginal revenue. Marginal revenues 63, marginal cost 62 and their intercept 64 are simultaneously shown in graph 61. The coordinates of 64 represent the optimal battery capacity for this ES application, delivering an internal rate of return (IRR) of 9% and a battery payback of 6.4 years. The graph is calculated by finding the revenues and costs for a set of ESS energy capacities (MWh) with other inputs held constant, then using finite differences or regression fits to compute and plot marginal values.

Figure 7:
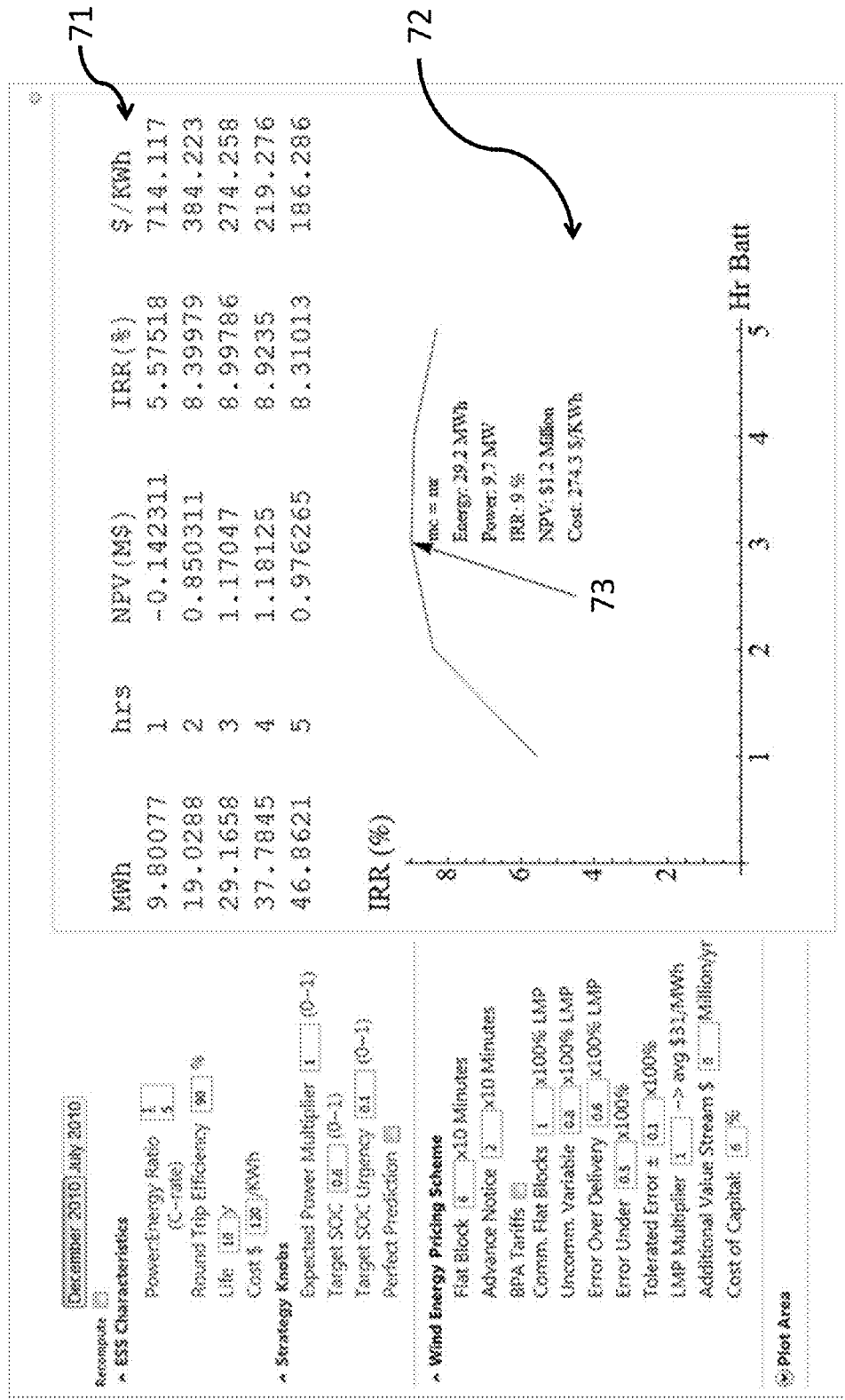
FIG. 7 shows an example of optimization of ESS characteristics for wind power regulation. In this example embodiment, optimization is performed comparing batteries of different power to energy ratios and optimal capacities, holding all other characteristics, such as pricing strategy and incentive fixed. In other embodiments, all variables are subject to optimization.

FIG. 7 presents an optimization exercise with respect to ESS characteristics (e.g., with the optimum quantity of ESS for each possible set of ESS characteristics having been determined by the prior optimization exercise). In this case, optimization is determined by finding the battery delivering the highest IRR. Table 71 lists numerical results for batteries of different capacities, energy to power ratios, net present values (NPV), internal rates of return, and ESS cost in $/kWh. Graph 72 is a plot of IRR against energy to power ratios (also measured in hours of battery discharge) and the highest IRR is found to be 9% for a 3-hour battery (point 73 in FIG. 7).

In all of the interfaces shown, the user can independently vary the inputs shown, whereupon the model recalculates and presents a revised set of graphs and calculations based on the changed input. This recalculation process can be near instantaneous.

Figure 8:
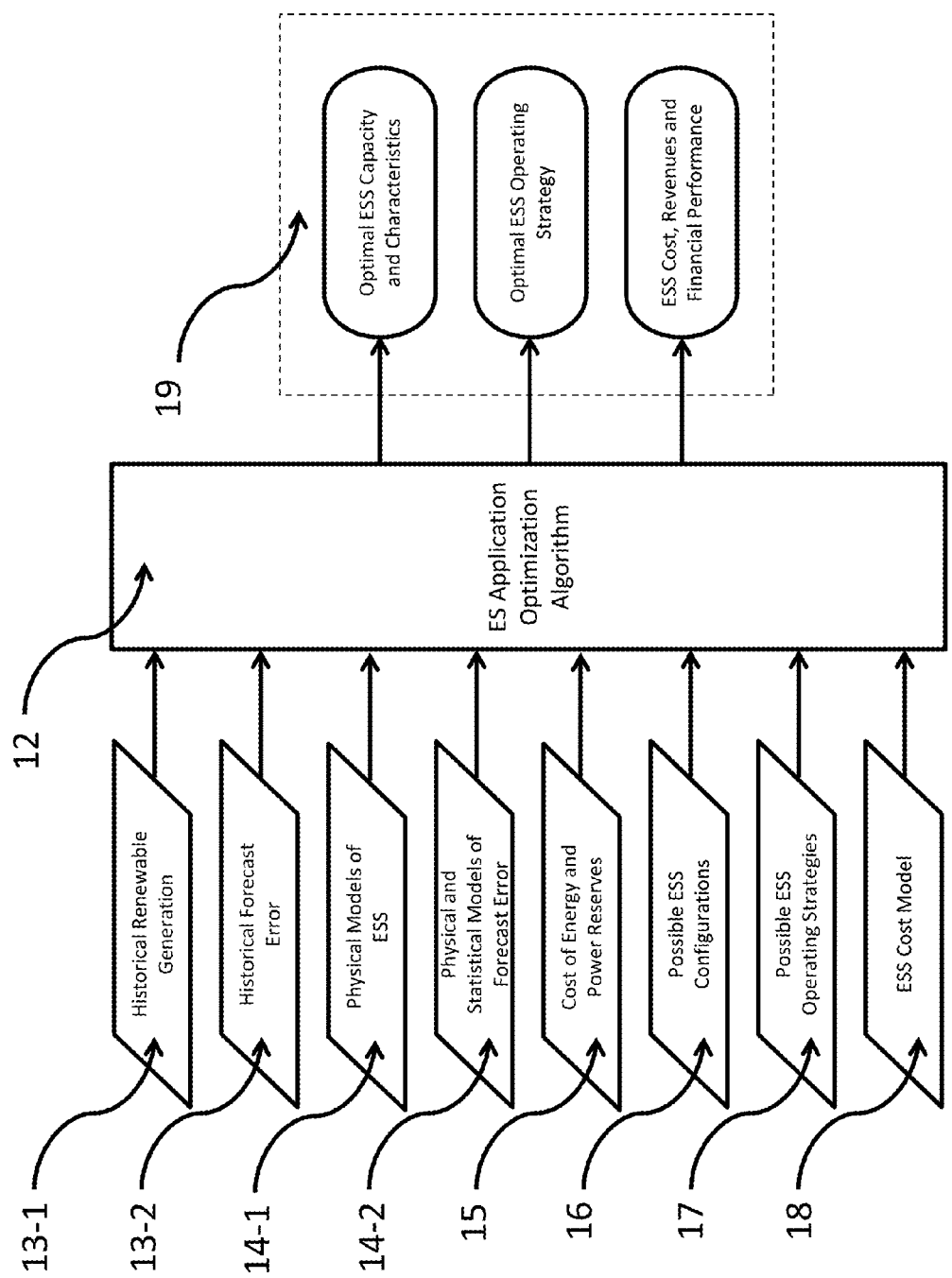
FIG. 8 is an exemplary schematic of one embodiment of an ES application optimization tool for supplying an optimal combination of an ESS and balancing reserves in support of uncertain renewable generation.

By way of another example, FIG. 8 illustrates an embodiment in a model that demonstrates the operation of an ESS installed for the purposes of minimizing the total cost of balancing renewable energy power fluctuations with a combination of energy storage and conventional reserves. Demand and supply for electric power must be balanced at all times in a power system. In order for this happen, system operators call generators in economic order up to real-time demand. However, because of the inherent uncertainty of renewable generators, real-time availability might differ from the amount that was previously committed. System operators must therefore carry a large amount of reserves to deal with last minute variations: The dispatch of these reserves goes by the name of balancing services. The addition and optimal operation of the right amount of ESS can reduce the total system cost of balancing services. This embodiment of the disclosed subject matter can calculate the optimal size and specifications of an ESS that is required to shape the power from a renewable energy generator in such a way that the total cost of ESS and balancing services is the lowest possible. This embodiment can also calculate how the total cost changes as function of resource forecast uncertainty, shaping requirements, cost of ESS, cost of reserves and ESS control strategy, among other things. This model can adopt the perspective of a system planner or system operator who is trying to minimize the cost of incorporating substantial amounts of renewable energy generation in the power grid. This model can also use the following inputs, amongst others:
  a. Historic renewable energy generation 13-1, typically in intervals of one hour or less, over a desired time period;
  b. Historic forecast error 13-2, typically in intervals of one hour or less;
  c. Physical models 14-1 of ESS, including ESS rate of degradation as a function of configuration and operating parameters;
  d. Forecast uncertainty model 14-2, including time of arrival error, magnitude error and other statistical description that will appear evident to those skilled in the art;
  e. Cost of providing reserves for energy and power 15;
  f. Possible ESS configurations 16 relating to ESS capacity, power rating, charge and discharge rates, useful life, efficiency losses and other characteristics;
  g. Possible ESS operating strategy 17 relating to the operating strategy in conjunction with reserves so that balancing costs are the lowest; and
  h. ESS cost model 18 relating to a separate proprietary model, and other relevant information, indicating the relative and absolute cost of ESS's having different technologically feasible characteristics (e.g. with respect to power, energy, cycle life, footprint, efficiency, etc.).

On the basis of the foregoing, the model can calculate the lowest cost combination of ESS and reserves to supply balancing requirements, accounting for user's defined forecast uncertainty, power shaping requirements and other system constraints.

Figure 9:
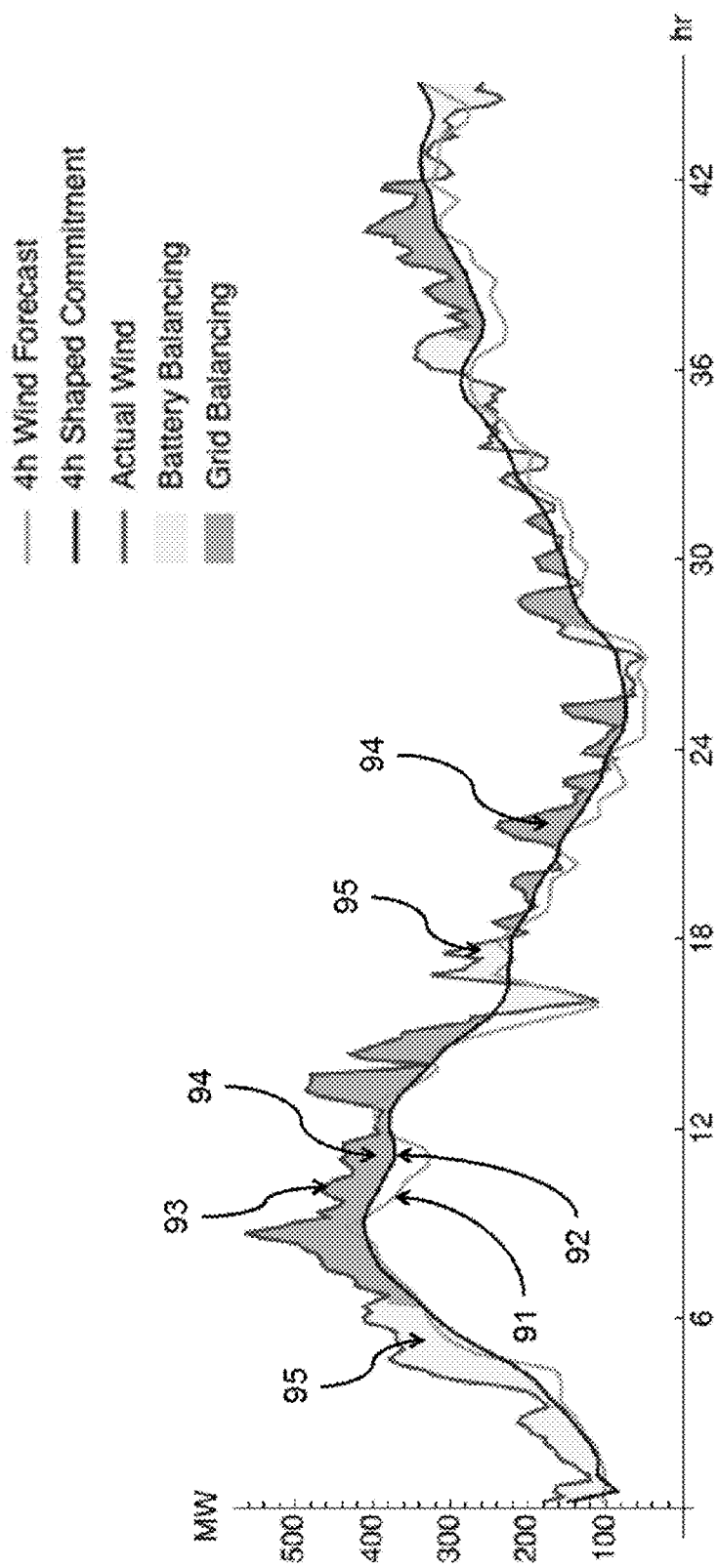
FIG. 9 illustrates an exemplary result of operating an ESS in concert with conventional reserves to provide balancing requirements in support of uncertain renewable generation.

By way of example, FIG. 9 shows illustrative time traces over a two-day period. Based on wind power forecast 91, a wind farm owner makes commitments to supply power 92. However, real-time wind power 93 happens to deviate from forecast 91 and reserves must be called to supply the mismatch. In this example a combination of ESS 95 and conventional reserves 94 are dispatched to achieve the lowest cost solution. Commitments 92 can be specified in blocks of arbitrary duration as short as one minute and as long as various hours. Commitments in each time block can be flat, slope or otherwise shaped according to arbitrary mathematical models. Commitments can be continuous or discontinuous between adjacent blocks.

Figure 10:
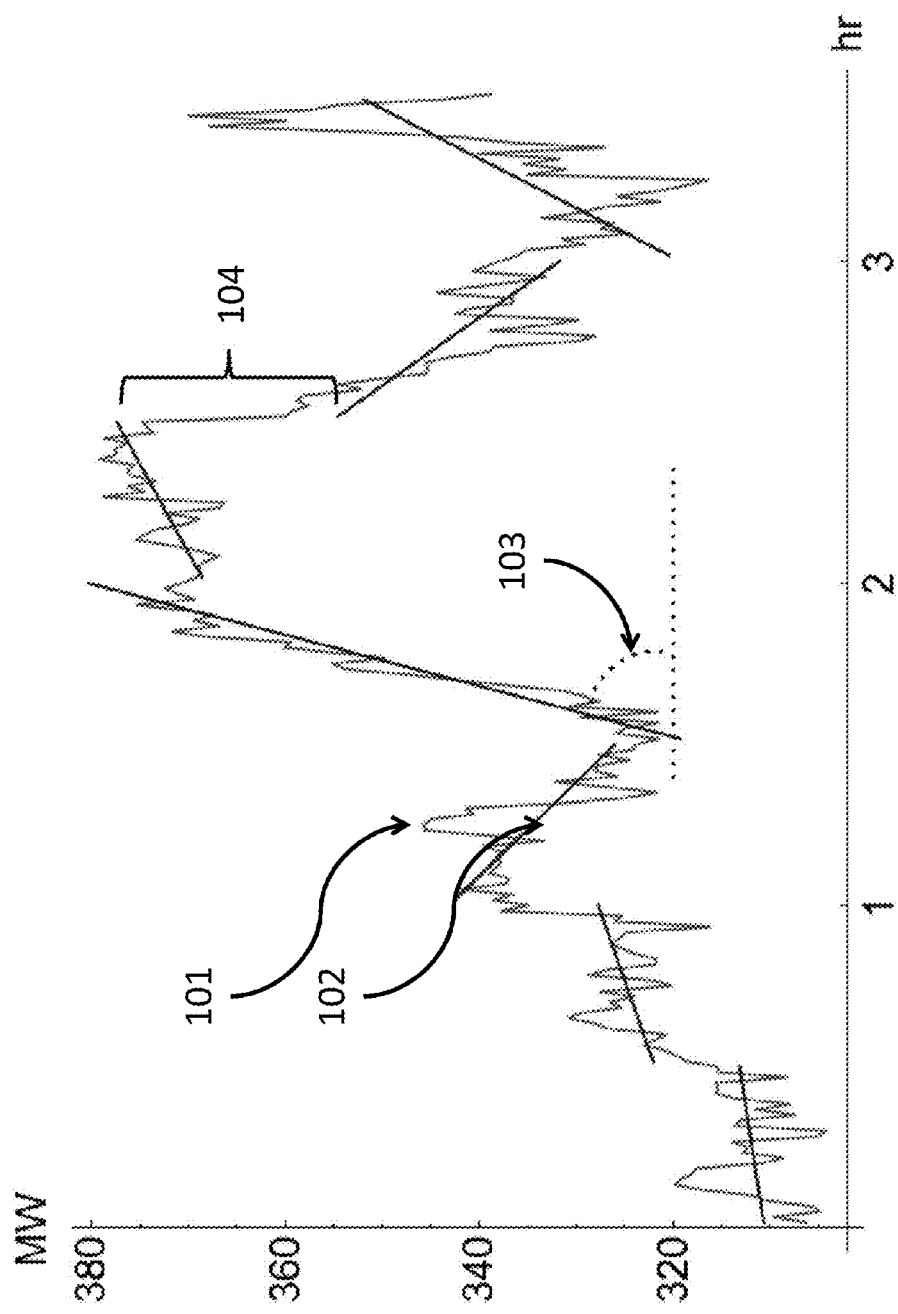
FIG. 10 illustrates an exemplary power shaping strategy applied to a renewable generation time trace to determine power block commitments.
Figure 11:
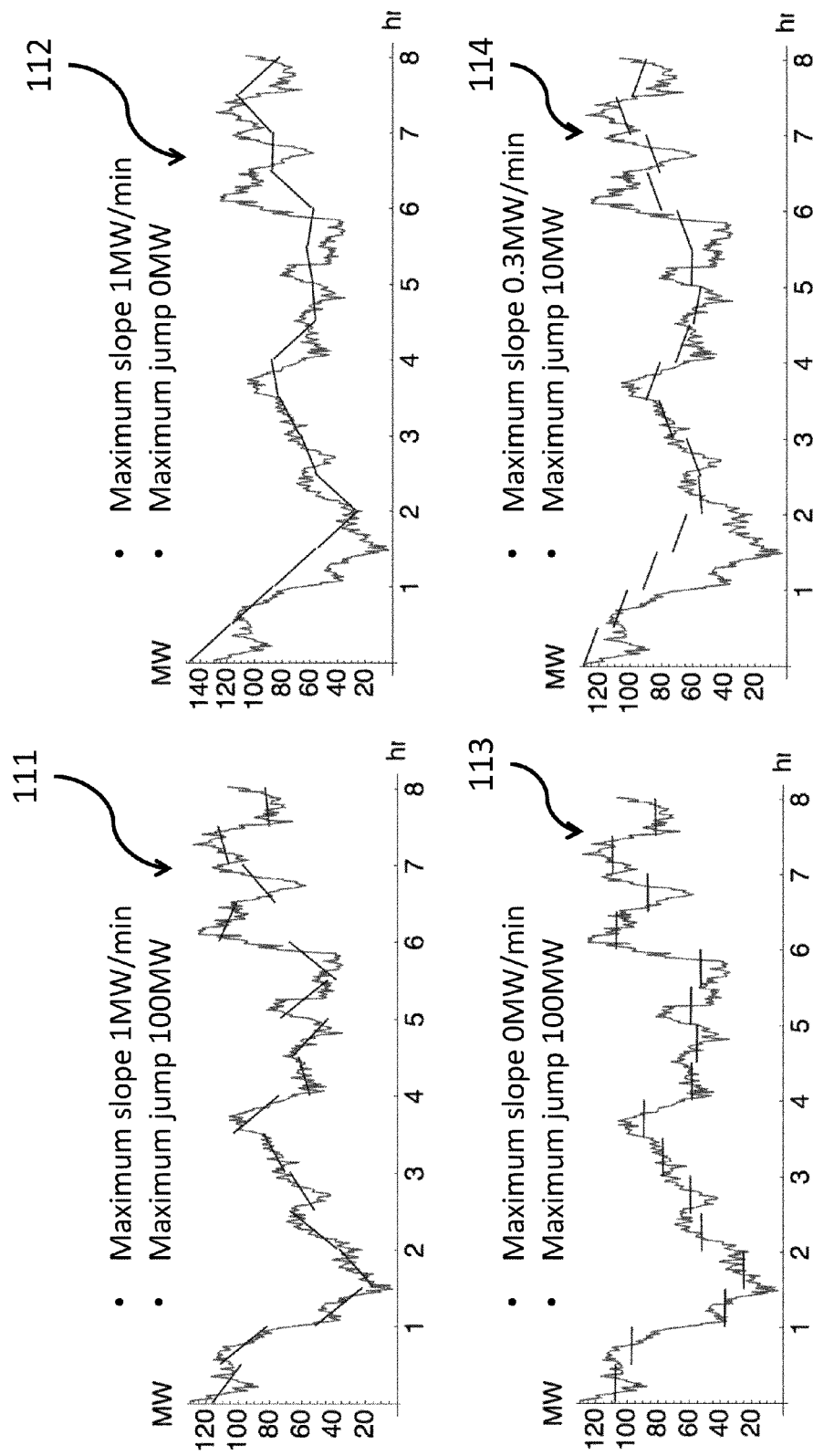
FIG. 11 illustrates alternative exemplary power shaping strategies applied to a renewable generation time trace to determine power block commitments.
Figure 12:
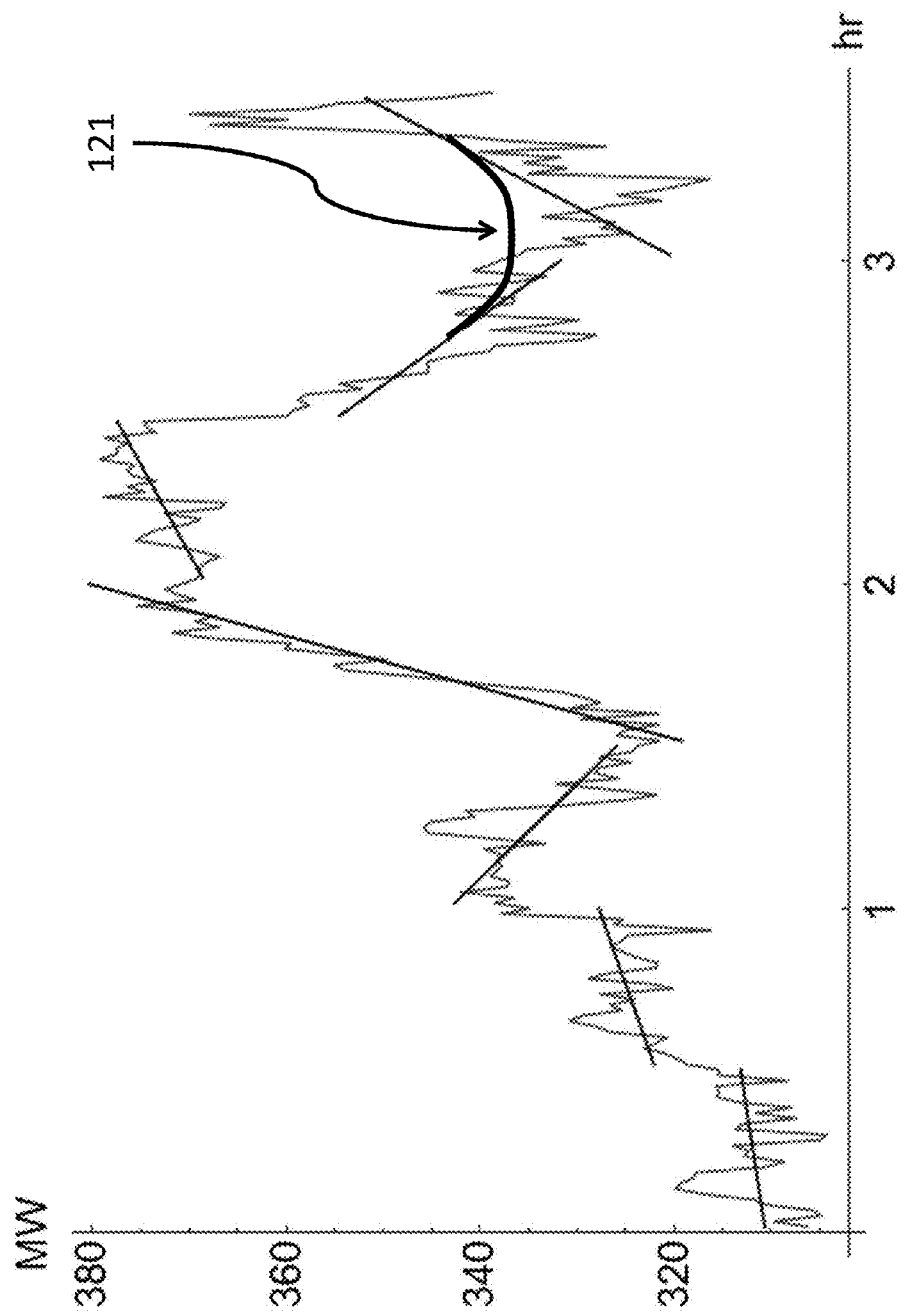
FIG. 12 illustrates an exemplary power shaping strategy applied to a renewable generation time trace with slope inversion constraints.

By way of example, FIG. 10 illustrates one method of shaping wind power 101 into thirty-minute block commitments 102 where each block is characterized by slope 103. Adjacent blocks are allowed to be discontinuous with jumps 104. By way of another example, FIG. 11 illustrates alternative methods of shaping wind power into thirty-minute block commitments, where the block duration is purely exemplary. Panel 111 illustrates wind shaping with maximum allowed slope of 1 MW/min and maximum allowed jump of 100 MW. Panel 112 illustrates wind shaping with maximum allowed slope of 1 MW/min and maximum allowed jump of 0 MW, which is equivalent to generating a continuous shape. Panel 113 illustrates wind shaping with maximum allowed slope of 0 MW/min and maximum allowed jump of 100 MW, which is equivalent to generating flat block commitments. Panel 114 illustrates wind shaping with maximum allowed slope of 1 MW/min and maximum allowed jump of 0.3 MW. By way of another example, FIG. 12 illustrates a case where the slope of adjacent power block commitments is made continuous by transition 121 and the slope reversal rate is constrained. This case is relevant, for example, when peaker power plants must track any variation in shaped output power and their speed to transition from an upward ramp to a downward ramp or from a downward ramp to an upward ramp is limited.

An optimal embodiment of possible ESS operating strategies 17 for wind shaping can implement the following algorithm:
  a. Calculate optimal power block commitments based on renewable resource forecast and constrained by user defined shape requirements. These commitments are optimal by way of requiring minimal additional reserves or ESS effort to fulfill any deviation from average forecasted power;
  b. Calculate difference between commitments and real-time renewable generation;
  c. Calculate combined ESS and reserves dispatch to minimize balancing cost, subject to ESS and system constraints;
  d. Calculate optimal ESS size and operating strategy;
  e. Maximum and minimum capacity and other operational constraints can be specified for the time horizon of ES application and can be updated dynamically as a function of external conditions as well as internal conditions (such as outage of ESS hardware);
  f. Many optimization strategies can be used to carry out the calculations in (e.), including linear and non-linear programming, as it will appear to those skilled in the art;
  g. The algorithm can re-compute all quantities periodically and possibly at each time step, in order to always enact the optimal strategy.

The model can also consider the financial impact of the ESS operating in conjunction with balancing reserves, taking into account both the capital cost and depreciation of assets and the recurring energy costs; and many other factors. For example, the actions of a battery can be modulated by the cost of battery operation during the simulation because the financial worth of supplying balancing services may be less than the amortized cost of owning and operating the ESS, including wear and depreciation of ESS hardware. Thus, the financial impact can operate as an integral component of ESS operation that is evaluated again at the end of a simulation to indicate the overall financial performance, which can be used for optimization and ultimately decision-making.

ES application optimization algorithm 12 can perform a series of optimization exercises to indicate the optimum ESS (in terms of power and energy), an optimum operation of this ESS in conjunction with the micro-grid assets, and the financial results achieved (e.g., outputs 19 in FIG. 8). This optimization can be based on balancing the total and marginal costs of an ESS with the total and marginal revenues/cost savings realized through its operation, and in this way can take into account the decreasing returns to scale of an ESS. The model can reflect broad sets of exogenous assumptions and inputs, but has been structured such that most of these can be varied to test and demonstrate ESS operations and benefits under a wide range of conditions.

For example, the model can compute the ROI or other financial metric for each of a set of strategies and ESS characteristics then choose the best strategy and ESS characteristics to achieve the greatest ROI or other financial metric. The optimum point can be located, for example, using list comparison, multivariate regression, local optimization techniques that travel up a local gradient vector, or other numerical optimization method known to those skilled in the art.

An exemplary set of outputs 19 can be a graphical and numerical representation of ESS performance, a list of financial metrics including but not limited to $USD, IRR, NPV, and those metrics as a function of ESS capacity, and the strategy used, including optimized strategy parameters.

Figure 13:
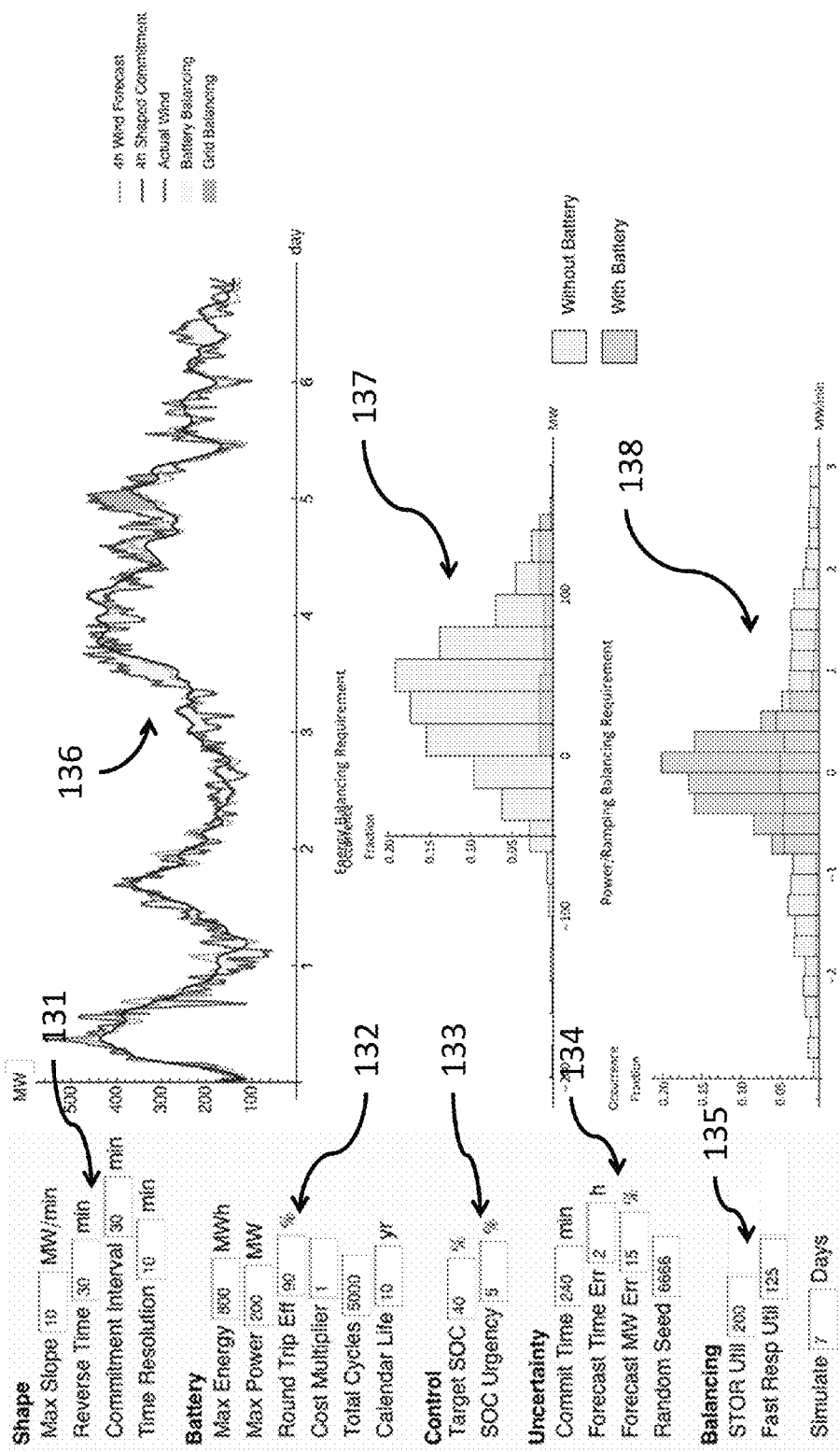
FIG. 13 shows an exemplary embodiment of the graphical interface of the renewable generation balancing tool.

FIG. 13 shows an exemplary embodiment of the graphical interface of the renewable energy balancing tool. Panel 131 controls shape requirements for block commitments; Panel 132 controls ESS size, life and economics; Panel 133 controls ESS feedback control strategy; Panel 134 controls forecast uncertainty; Panel 135 sets the cost of conventional energy and power reserves; Graph 136 shows granular renewable energy generation and dispatch of an ESS and reserves for balancing the mismatch of forecast and real-time; Graph 137 shows the statistical distribution of energy balancing requirements; Graph 138 shows the statistical distribution of power balancing requirements.

Figure 14:
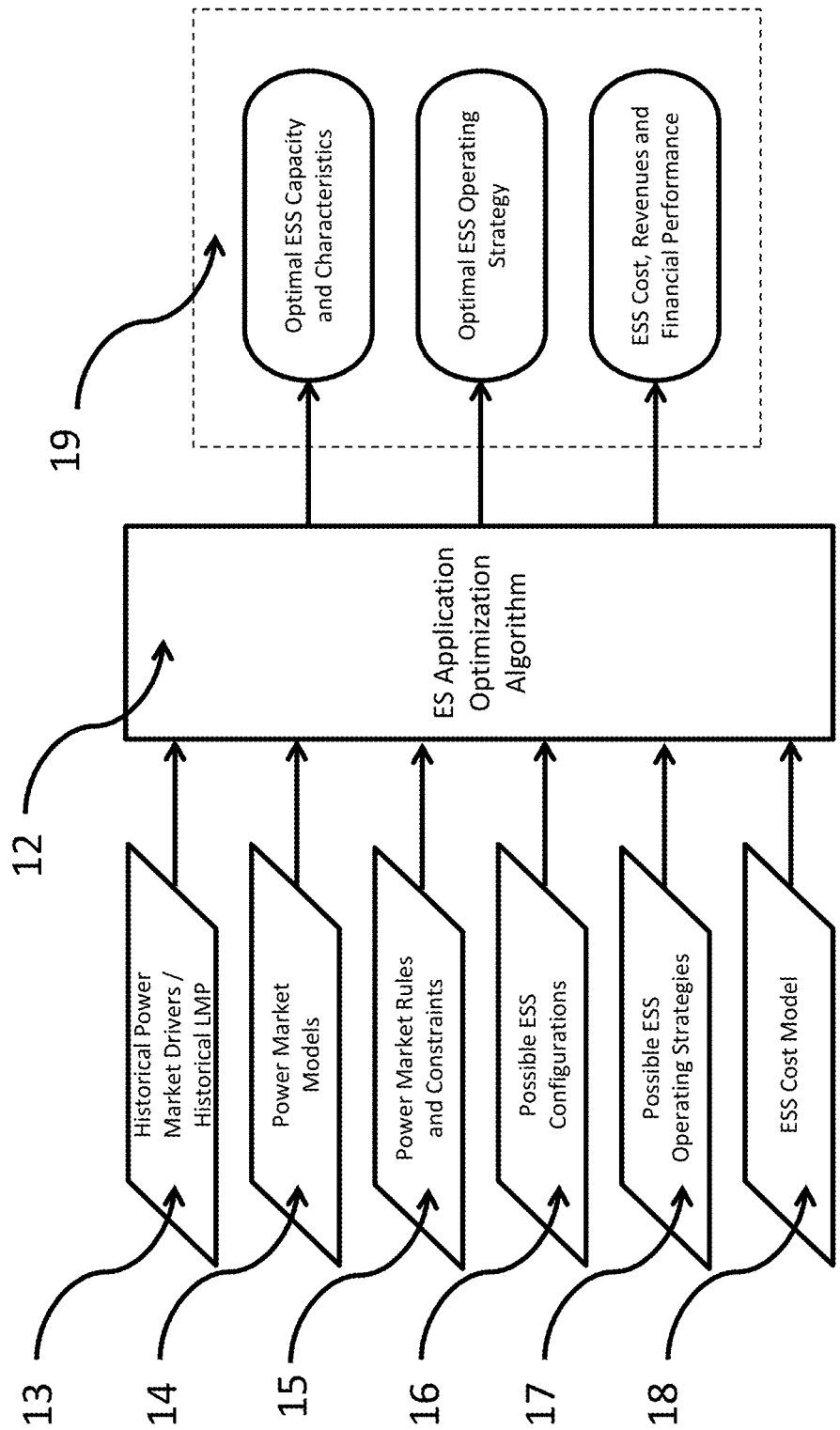
FIG. 14 is an exemplary schematic of one embodiment of an ES application optimization tool for power arbitrage.

By way of another example, FIG. 14 illustrates an embodiment in a model that demonstrates a near-optimal charge and discharge schedule for energy arbitrage with a model ESS. This model can also use the following key inputs, amongst others:
  a. Historical LMP 13 at the node where power is bought and sold, in intervals of one hour or less, over multi-month periods;
  b. Power market models 14, including primary market drivers that can affect power price dynamics and buy-sell decisions;
  c. Power market rules and Constraints 15, conditioning the ability to execute buy-sell trades;
  d. Possible ESS configurations 16 relating to ESS capacity, power rating, charge and discharge rates, useful life, efficiency losses and other characteristics;
  e. Possible ESS operating strategy 17 relating to the operating strategy in conjunction with power markets so that most of the value of power price volatility can be captured; and
  f. ESS cost model 18 relating to a separate proprietary model, and other relevant information, indicating the relative and absolute cost of ESS's having different technologically feasible characteristics (e.g. with respect to power, energy, cycle life, footprint, efficiency, etc.).

On the basis of the foregoing, the model can compare the amortized cost of cycle life damage and round trip efficiency losses to the benefits of each potential energy "trade" such that unprofitable trades can be avoided. The low and high price points for purchase and sale of energy, respectively, can be identified from a large set with a novel peak-trough locating algorithm (e.g., ES application possible ESS operating strategies 17 in FIG. 14). By moving a window of comparison that causes pruning when local marginal price points are not local extrema or when the points do not make profitable trades, the algorithm can prune intermediate value points and create a list of maxima satisfying the profitable trade criterion, as it will be apparent to those skilled in the art.

Figure 15:
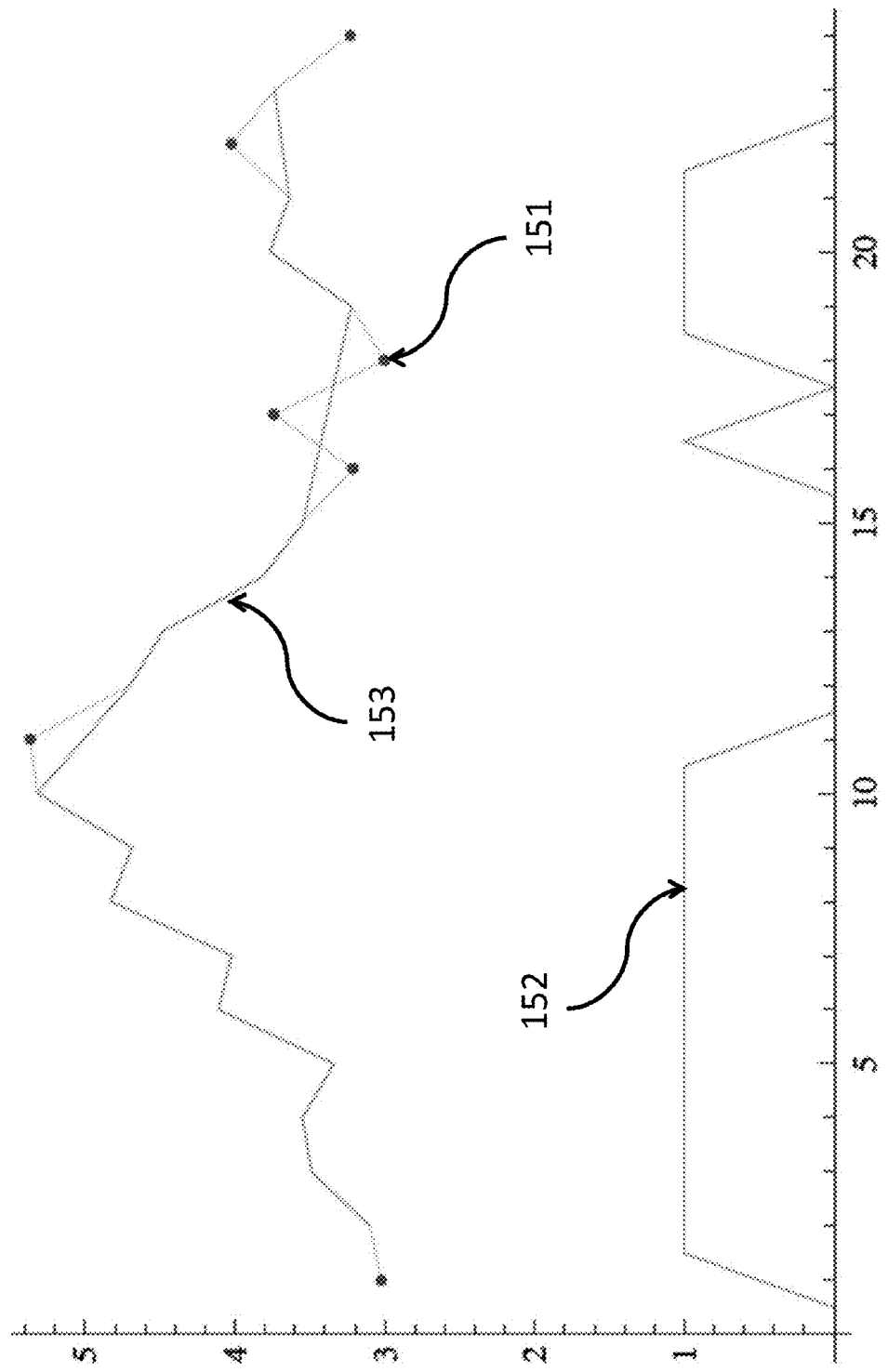
FIG. 15 illustratively shows one example of the buy-sell pruning algorithm according to one embodiment of the ES application optimization tool for power arbitrage.

FIG. 15 illustrates an embodiment of the peak-trough locating algorithm. Buy-sell pairs (blue dots 151) are identified and charge and discharge orders 152 are scheduled. Subsequently, blue dots 151 are pruned from the set, which is left non-uniformly sampled (line 153). These buy-sell pairs can then be sequentially assigned as ESS charge and discharge orders of magnitude equal to the ESS maximum power rating. Since the ESS may have more energy available to use, multiple iterations can be possible. Buy-sell pairs can be subsequently removed from the price curve and the process can be repeated multiple times to get other lists of actions. For an N hour ESS, N action layers can provide charge scheduling within ESS power and energy limits. Because the algorithm stated can allow rapid long-term optimization, an ESS can assess the value of energy storage independent of preset price points or other situation-based inputs. Instead, it is capable of adapting to changes as they appear in the forecast.

The model can also consider the financial impact of power arbitrage operating in conjunction with the ESS, taking into account, for example, the financial worth of buy-sell trades; the capital cost, cycling-dependent ESS degradation, useful life and efficiency losses of the ESS; and many other factors. For example, the actions of a battery can be modulated by the cost of battery operation during the simulation because the financial worth of buy-sell trades may be less than the amortized cost of owning and operating the ESS, including wear and depreciation of ESS hardware. Thus, the financial impact can operate as an integral component of ESS operation that is evaluated again at the end of a simulation to indicate the overall financial performance, which can be used for optimization and ultimately decision-making.

ES application optimization algorithm 12 can perform a series of optimization exercises to indicate the optimum ESS (in terms of power and energy), an optimum operation of this ESS in conjunction with power arbitrage, and the financial results achieved (e.g., outputs 19 in FIG. 14). This optimization can be based on balancing the total and marginal costs of an ESS with the total and marginal revenues/cost savings realized through its operation, and in this way takes into account the decreasing returns to scale of an ESS. The model can reflect broad sets of exogenous assumptions and inputs, but can be structured such that most of these can be varied to test and demonstrate ESS operations and benefits under a wide range of conditions.

For example, the model can compute the ROI or other financial metric for each of a set of strategies and ESS characteristics then choose the best strategy and ESS characteristics to achieve the greatest ROI or other financial metric. The optimum point can be located, for example, using list comparison, multivariate regression, local optimization techniques that travel up a local gradient vector, or other numerical optimization method known to those skilled in the art.

Figure 16:
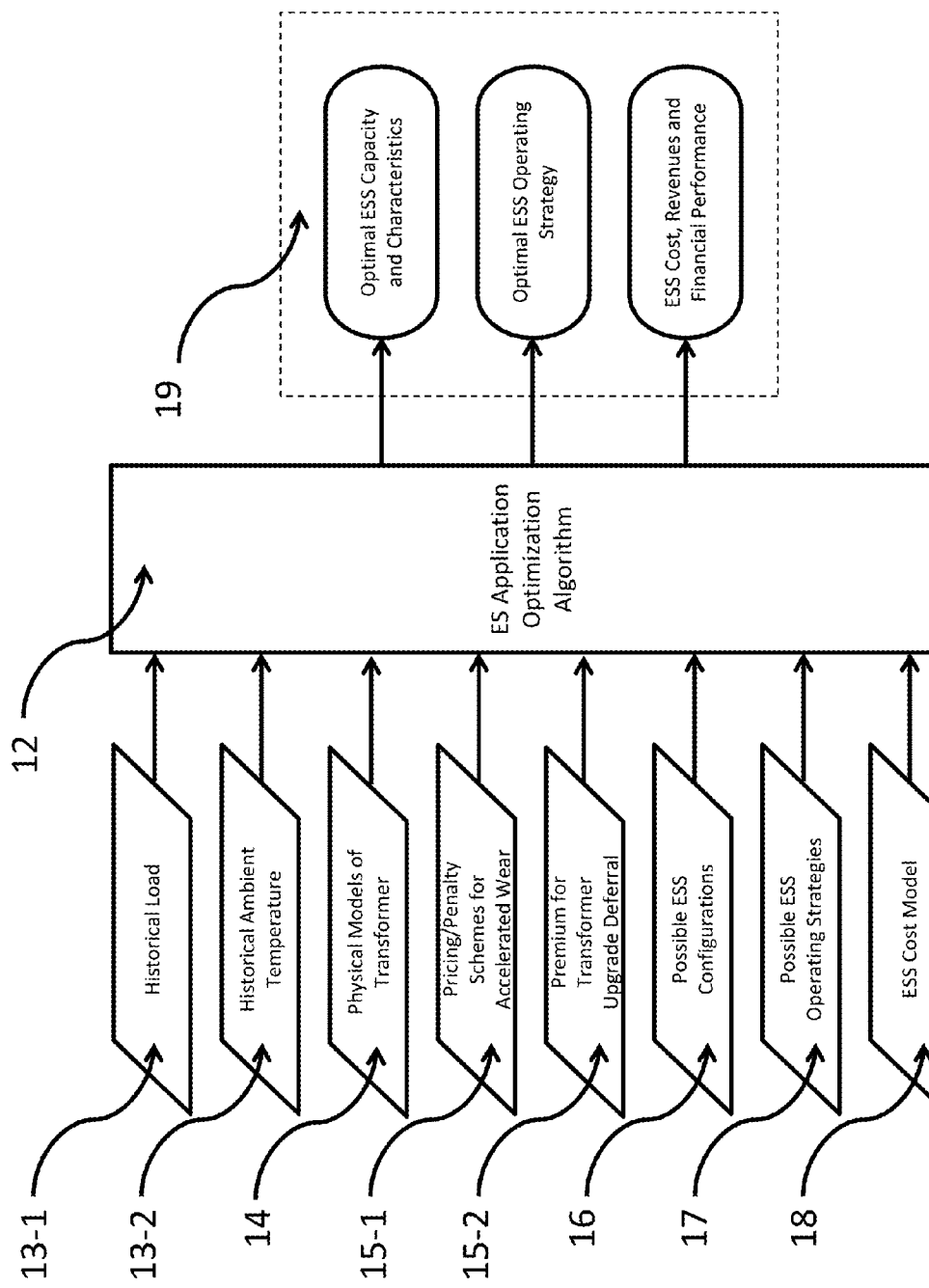
FIG. 16 is an exemplary schematic of one embodiment of an ES application optimization tool for peak load shaving and transformer overload protection.

An exemplary set of outputs 19 can be a graphical and numerical representation of ESS performance, a list of financial metrics including but not limited to $USD, IRR, NPV, and those metrics as a function of ESS capacity, and the strategy used, including optimized strategy parameters By way of another example, FIG. 16 illustrates an embodiment in a model that demonstrates the operation of an ESS installed for the purposes of shaving peak loads. This embodiment can protect substation and distribution transformers and can also help defer their upgrade. This model can adopt the perspective of a substation transformer periodically driven above its rated power during periods of peak load. This model can also use the following key inputs, amongst others:
  a. Historical load 13-1 at the transformer, in intervals of one hour or less, over multi-month periods;
  b. Historical ambient temperature 13-2 at the transformer location, in intervals of one hour or less;
  c. Physical models of transformer 14, including the transformer thermodynamic equations, calibrated with the transformer test reports as well as any available records of the transformer historical performance;

d. Pricing/penalty schemes for accelerated wear 15-1 aimed at internalizing the costs incurred as a result of accelerated depreciation and premature decommissioning as a consequence of transformer overload;

e. Premium for transformer upgrade deferral 15-2 aimed at capturing all incentives from deferring upgrade of the transformer, for example the opportunity cost of capital elsewhere invested;

f. Possible ESS configurations 16 relating to ESS capacity, power rating, charge and discharge rates, useful life, efficiency losses and other characteristics;

g. Possible ESS operating strategy 17 relating to the operating strategy in conjunction with the transformer so that the transformer is operated most of the time below its rated maximum; and h. ESS cost model 18 relating to a separate proprietary model, and other relevant information, indicating the relative and absolute cost of ESS's having different technologically feasible characteristics (e.g. with respect to power, energy, cycle life, footprint, efficiency, etc.).

On the basis of the foregoing, the model can solve the relevant thermodynamic equations to calculate transformer oil and windings temperature in the most general conditions. This can be significantly more accurate than the approximate set of equations advised in the IEEE C57.91-1995 standard and therefore can enable tighter margins of operation and fuller transformer capacity utilization.

An often referenced example of thermodynamic modeling of substation transformers is G. Swift in IEEE TRANSACTIONS ON POWER DELIVERY, VOL. 16, NO. 2, APRIL 2001. Accelerated aging as a function of temperature can be calculated according to the Arrhenius activation model adopted in the same standard, or any other custom aging model, calibrated against historical data, where available.

Figure 17:
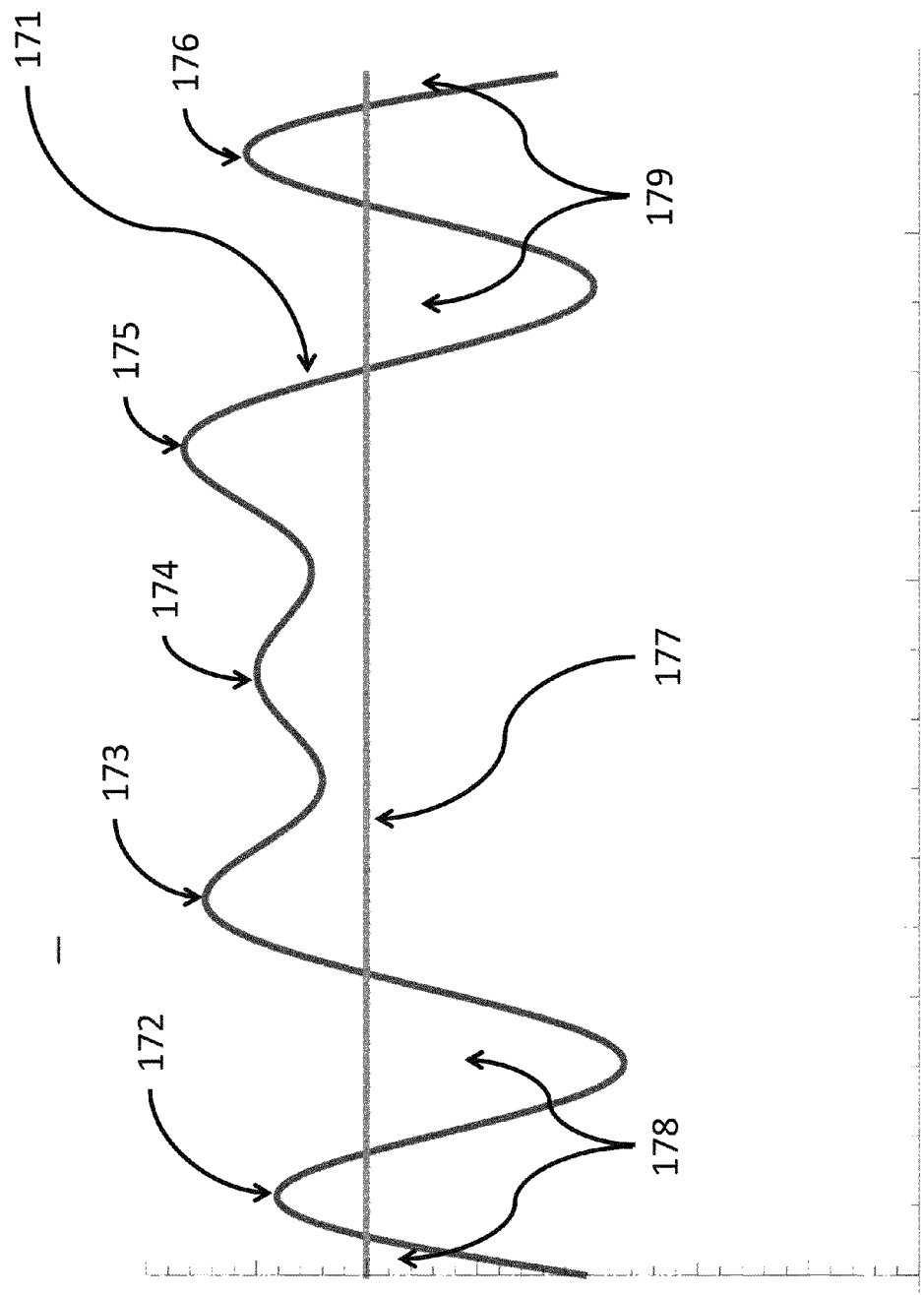
FIG. 17 shows an exemplary operation of real time control in one illustrative example where ESS capacity is optimally allocated in order to mitigate multiple load peaks in a 48-hour time horizon.

By way of example, FIG. 17 shows illustrative transformer load profile 171 over 48-hour period characterized by five peaks 172 through 176 that exceed transformer rated power 177. An optimal embodiment of possible ESS operating strategies 17 for transformer deferral can implement the following algorithm:

a. Calculate accelerated wear of windings insulation for given load and ambient temperature;

b. Quantify relative wear for each overload peak;

c. Identify periods of time when transformer is not overloaded and ESS recharge is possible (Recharge Periods 178 and 179 in FIG. 17);

d. Identify idle times when no ESS operation is permitted;

e. Calculate optimal allocation of available capacity to mitigate overload peaks in such a way that minimizes transformer wear, while respecting ESS operational constraints (such as maximum and minimum capacity throughout the 48-hour period);

f. Maximum and minimum capacity and other operational constraints can be specified for the time horizon of ES application and can be updated dynamically as a function of external conditions as well as internal conditions (such as outage of ESS hardware);

g. Many optimization strategies can be used to carry out the calculations in (e.), including linear and non-linear programming, as it will appear to those skilled in the art;

h. The algorithm can re-compute all quantities periodically and possibly at each time step, in order to always enact the optimal strategy.

The model can also consider the financial impact of the transformer operating in conjunction with the ESS, taking into account the economic impact of unmitigated periodic overloads of the transformer as well as the opportunity cost of deferring investment in a new transformer; the capital cost, useful life and efficiency losses of the ESS; and many other factors. For example, the actions of a battery can be modulated by the cost of battery operation during the simulation because the financial worth of peak load shaving at the transformer may be less than the amortized cost of owning and operating the ESS, including wear and depreciation of ESS hardware. Thus, the financial impact can operate as an integral component of ESS operation that is evaluated again at the end of a simulation to indicate the overall financial performance, which can be used for optimization and ultimately decision-making.

ES application optimization algorithm 12 can perform a series of optimization exercises to indicate the optimum ESS (in terms of power and energy), an optimum operation of this ESS in conjunction with the transformer, and the financial results achieved (e.g., outputs 19 in FIG. 16). This optimization can be based on balancing the total and marginal costs of an ESS with the total and marginal revenues/cost savings realized through its operation, and in this way takes into account the decreasing returns to scale of an ESS. The model can reflect broad sets of exogenous assumptions and inputs, but has been structured such that most of these can be varied to test and demonstrate ESS operations and benefits under a wide range of conditions.

For example, the model can compute the ROI or other combinations of financial metrics for each of a set of strategies and ESS characteristics then choose the best strategy and ESS characteristics to achieve the greatest ROI or other combinations of financial metrics. The optimum point can be located, for example, using list comparison, multivariate regression, Monte Carlo, local optimization techniques that travel up a local gradient vector, or other numerical optimization method known to those skilled in the art.

An exemplary set of outputs 19 can be a graphical and numerical representation of ESS performance, a list of financial metrics including but not limited to $USD, IRR, NPV, and those metrics as a function of ESS capacity, and the strategy used, including optimized strategy parameters. The optimum point can be located, for example, using list comparison, multivariate regression, local optimization techniques that travel up a local gradient vector, or other numerical optimization method known to those skilled in the art.

Figure 18:
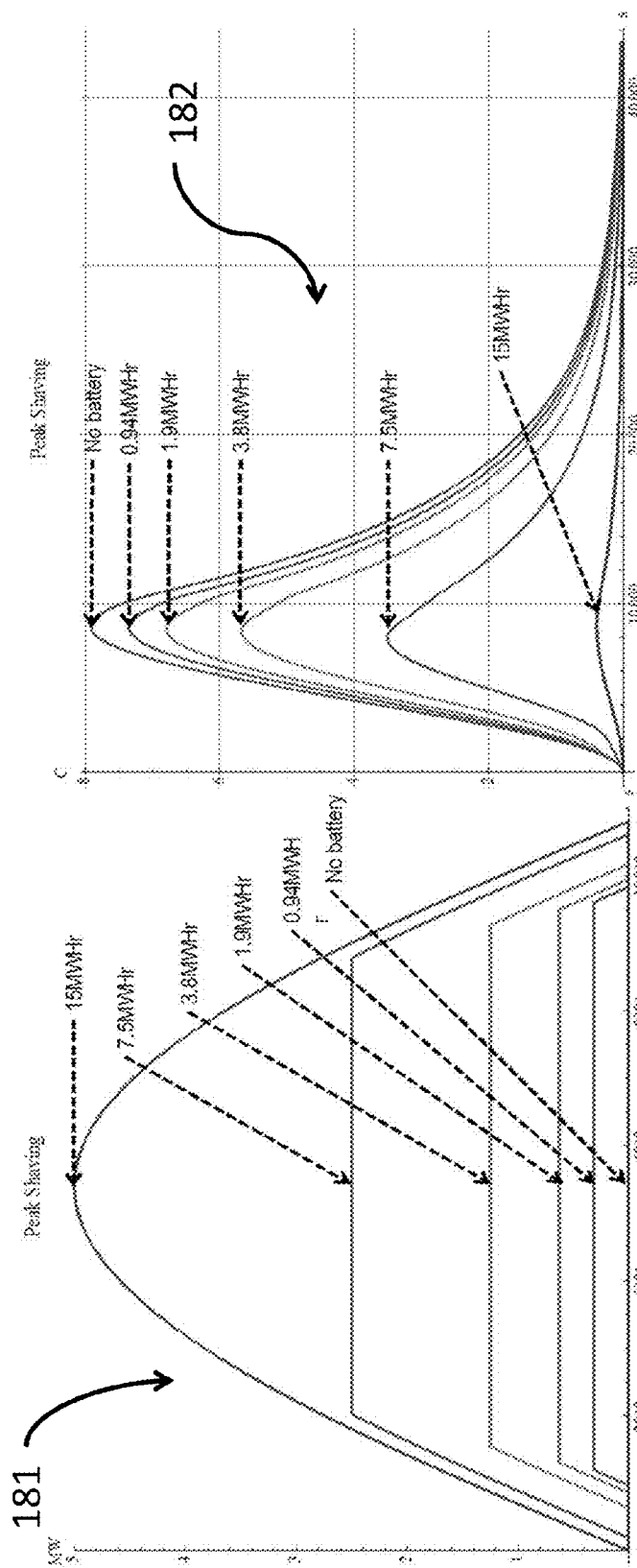
FIG. 18 illustrates an exemplary result of operating a set of ESS of different sizes and in an optimal manner for shaving a sinusoidal peak load.

FIG. 18 presents an exemplary basic operation of an ESS to shave load peaks at a substation transformer. Graph 181 illustrates the effect of various batteries in mitigating a sinusoidal peak of amplitude 5 MW: all batteries were operated according to the optimal strategy of shaving the uppermost part of the peak to an extent compatible with the battery capacity and power limits. Graph 182 illustrates the corresponding effect in mitigating the temperature overrun of the hottest spot in the transformer windings: an optimally operated, 15 MWh battery is able to limit such effect to below 1° C., whereas the temperature would have risen by approximately 8° C. with no battery. In this example, the transformer had a rated power of 25 MVA and hot spot temperature at rated power of 110 degrees C. A 20% overload can therefore determine a substantial increase in hot spot temperature; frequent overload can cause non-negligible wear of windings insulation.

Figure 19:
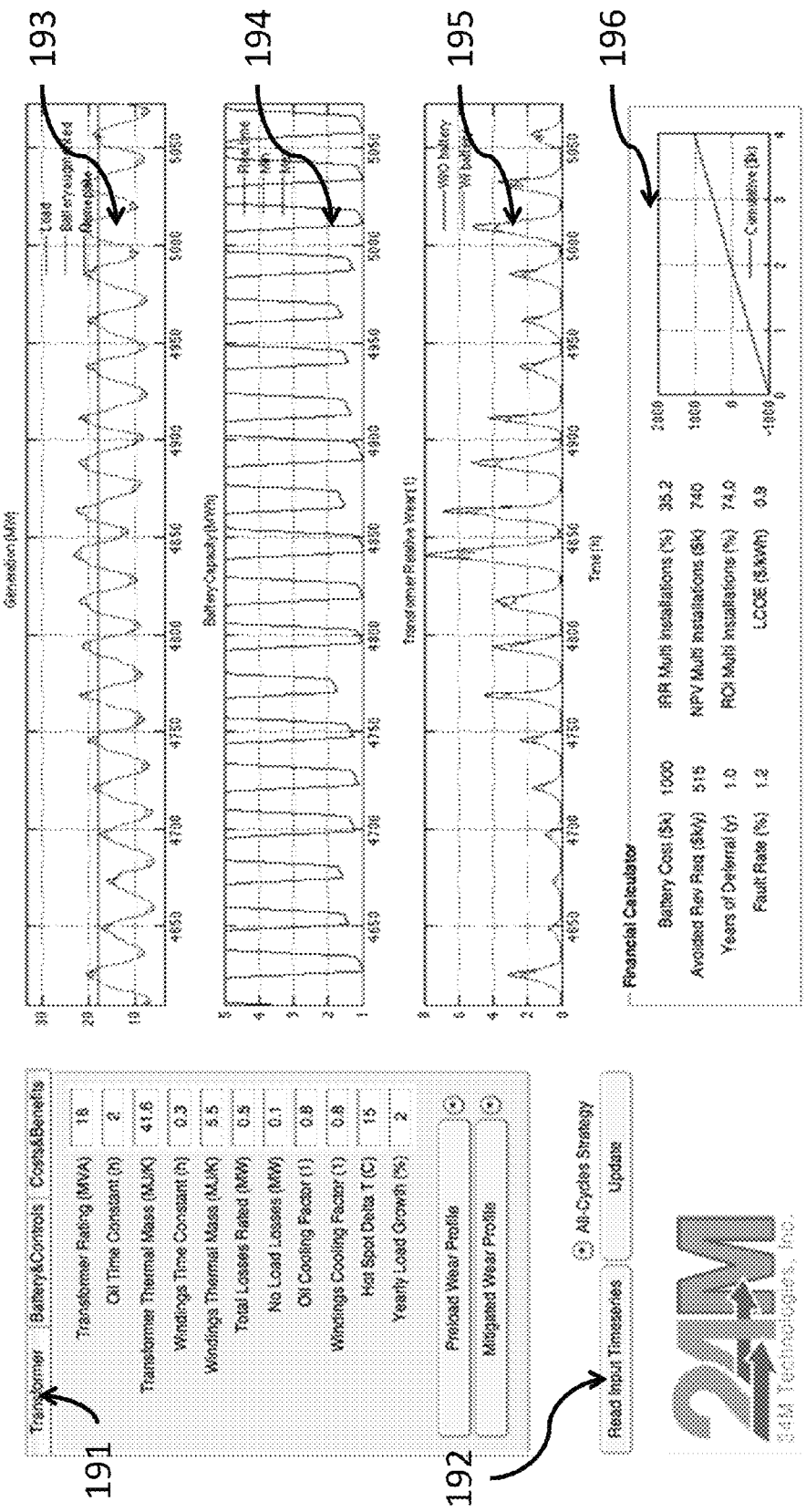
FIG. 19 shows an exemplary embodiment of the graphical interface of the peak load shaving and transformer overload protection optimization tool.

FIG. 19 shows an exemplary embodiment of the graphical interface of the transformer deferral optimization tool. Panel 191 sets out key inputs regarding specifications of the transformer, including (i) transformer rated power and losses, (ii) thermal masses and time constants of insulating mineral oil and transformer windings, and (iii) parameters to calculate transformer degradation. A user can independently vary all of these inputs. Button 192 allows a user to import custom load and temperature profiles.

Graph 193 contains a shape of transformer load, which is one input to the model. Graph 194 contains a shape of ESS dispatch, which relates to the shape of power supplied by the battery to augment generation and serve load. This could be generic and user defined. For example, battery dispatch can shave the very uppermost part of the load peak. Alternatively, battery dispatch can shave a front, a central or a back portion of the shape describing the load peak. In yet another example, battery dispatch could deliver constant power for the full or partial duration of the load peak; Graph 195 contains a shape of transformer wear caused by transformer load with and without ESS mitigation; Panel 196 shows summary financial metrics from transformer deferral application.

Windings insulation wear can be calculated from the windings temperature by means of the Arrhenius activation equation advised in the IEEE 057.91-1995 standard, which is customary for this application and is well known to those skilled in the art. By further integrating the windings insulation wear function over the duration of the peak event and comparing the same with the degree of wear had the temperature stayed at the maximum transformer rated value, the excess wear with respect to baseline can be calculated. The financial losses from accelerated wear of the transformer can be compared with the cost of the ESS to assess the financial merits of this application.

The model can compute the aggregate financial metrics of subsequent uses of ESS at multiple sites. For example, an ESS can be designed to defer a transformer upgrade at a specific location for a number of years. After this period has elapsed, the ESS can be moved to another location and support another transformer for a number of years. The benefits of both applications must then be accounted for in the valuation of ESS economics.

Figure 20:
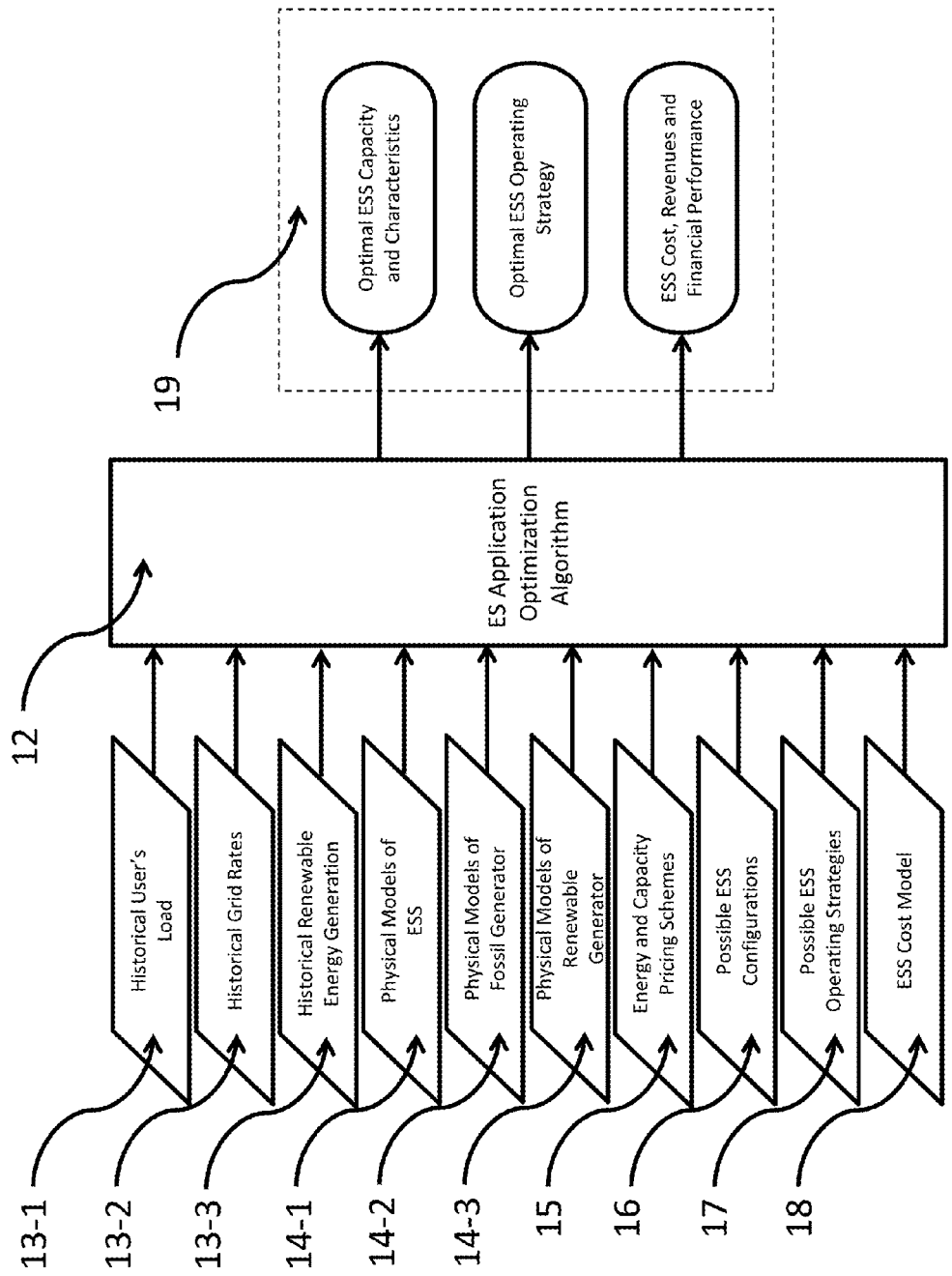
FIG. 20 is an exemplary schematic of one embodiment of an ES application optimization tool for minimizing energy cost in a micro-grid installation.

By way of another example, FIG. 20 illustrates an embodiment in a model that demonstrates the operation of an ESS installed for the purposes of minimizing the energy cost of a micro-grid installation also incorporating renewable power, on-site fossil fuel generator and grid access. This embodiment can minimize the energy cost by one of two possible strategies. If a power grid is present and able to supply users' power demand, an ESS can generate value by shaving peak load and avoiding peak demand charges, which also may relieve distribution transformer overload, and by performing energy arbitrage between off-peak and peak hours or between renewable energy in excess of load and peak hours. If, on the other hand, the micro-grid does not have grid access, an ESS can generate value by storing excess renewable energy and displacing fuel consumption and by optimizing the regime at which a fossil fuel generator, or portfolio of other power sources, will run. For example, diesel generators are notoriously inefficient at low load fractions. In such cases, the generator can be run at full capacity and any energy produced in excess of instantaneous load can be stored in the battery for future use, resulting in a net gain in fuel efficiency, as it will be obvious to those skilled in the art. A portfolio of diesel generators will typically have different supply versus efficiency characteristic, in which case the strategy of portfolio management will be coupled to ESS characteristics and usage algorithms. This model can adopt the perspective of a user trying to minimize its energy cost with a micro-grid type installation. This model can also use the following key inputs, amongst others:

a. Historic user's load 13-1, typically in intervals of one hour or less, over a desired time period;
b. Historic grid rates 13-2, typically in intervals of one hour or less;
c. Historic renewable energy generation 13-3, typically in intervals of one hour or less;
d. Physical models 14-1 of ESS, including ESS rate of degradation as a function of configuration and operating parameters;
e. Physical models of on-site fossil fuel generator 14-2, including fuel efficiency as a function of operating point and rate of degradation over time;
f. Physical models of renewable generator 14-3, including rate of degradation over time;
i. Physical models and usage costs of each generator in a portfolio of generators;
g. Pricing schemes 15 for peak and off-peak energy rates, peak demand charges and net-metering benefits that apply when excess renewable energy is sold back to the grid;
h. Possible ESS configurations 16 relating to ESS capacity, power rating, charge and discharge rates, useful life, efficiency losses and other characteristics;
i. Possible ESS operating strategy 17 relating to the operating strategy in conjunction with the other micro-grid assets so that power absorbed from the grid is always kept below this user defined threshold; and
j. ESS cost model 18 relating to a separate proprietary model, and other relevant information, indicating the relative and absolute cost of ESS's having different technologically feasible characteristics (e.g. with respect to power, energy, cycle life, footprint, efficiency, etc.).

On the basis of the foregoing, the model can calculate the lowest cost dispatch of available resources to meet the user power demand, while complying with the user's defined maximum grid absorption.

Figure 21:
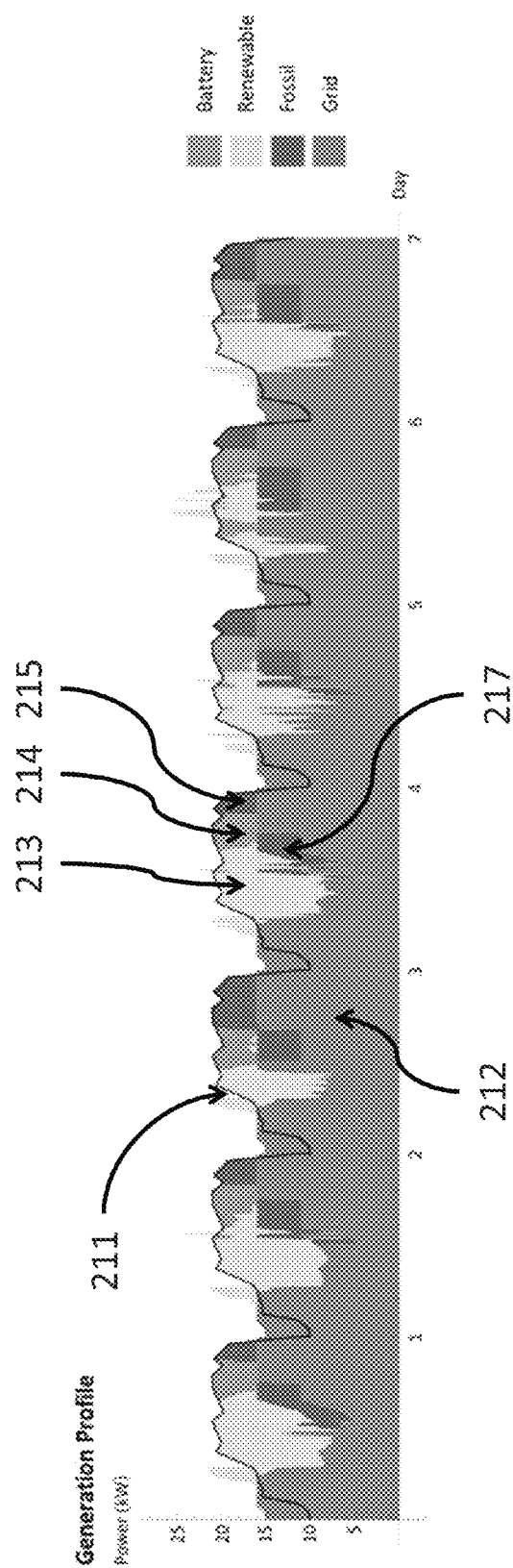
FIG. 21 shows an exemplary operation of real time control in one illustrative example where ESS capacity is optimally allocated in order to minimize energy cost in a micro-grid installation.

By way of example, FIG. 21 shows illustrative commercial user's load profile 211 over a weeklong period. The load can be served by a combination of grid energy 212, photovoltaic energy 213, battery 214 and on-site fossil fuel generator (e.g., 215, 217 as explained below), such as diesel or fuel cell. An optimal embodiment of possible ESS operating strategies 17 for micro-grids can implement the following algorithm:

a. Calculate user's load net of renewable energy generator;
b. Impose user defined grid absorption limit;
c. Calculate battery dispatch to shave peak load and perform energy arbitrage between off-peak and peak hours as well as excess renewable energy generation and peak hours;
d. Dispatch on-site fossil generator to fulfill grid limit constraint (215) as well as to achieve lowest energy cost during peak hours (217);
e. Maximum and minimum capacity and other operational constraints can be specified for the time horizon of ES application and can be updated dynamically as a function of external conditions as well as internal conditions (such as outage of ESS hardware);

h. Operating strategies for the ESS can be updated depending on changes in supply and demand of power sources.

f. Many optimization strategies can be used to carry out the calculations in (e.), including linear and non-linear programming, as it will appear to those skilled in the art;

g. The algorithm can re-compute all quantities periodically and possibly at each time step, in order to always enact the optimal strategy.

The model can also consider the financial impact of the micro-grid assets operating in conjunction with the ESS, taking into account both the capital cost and depreciation of micro-grid assets and the recurring energy costs; and many other factors. For example, the actions of a battery can be modulated by the cost of battery operation during the simulation because the financial worth of peak load shaving may be less than the amortized cost of owning and operating the ESS, including wear and depreciation of ESS hardware. Thus, the financial impact can operate as an integral component of ESS operation that is evaluated again at the end of a simulation to indicate the overall financial performance, which can be used for optimization and ultimately decision-making.

ES application optimization algorithm 12 can perform a series of optimization exercises to indicate the optimum ESS (in terms of power and energy), an optimum operation of this ESS in conjunction with the micro-grid assets, and the financial results achieved (e.g., outputs 19 in FIG. 20). This optimization can be based on balancing the total and marginal costs of an ESS with the total and marginal revenues/cost savings realized through its operation, and in this way takes into account the decreasing returns to scale of an ESS. The model can reflect broad sets of exogenous assumptions and inputs, but has been structured such that most of these can be varied to test and demonstrate ESS operations and benefits under a wide range of conditions.

For example, the model can compute the ROI or other combinations of financial metrics for each of a set of strategies and ESS characteristics then choose the best strategy and ESS characteristics to achieve the greatest ROI or other combinations of financial metrics. The optimum point can be located, for example, using list comparison, multivariate regression, local optimization techniques that travel up a local gradient vector, or other numerical optimization method known to those skilled in the art.

An exemplary set of outputs 19 can be a graphical and numerical representation of ESS performance, a list of financial metrics including but not limited to $USD, IRR, NPV, and those metrics as a function of ESS capacity, and the strategy used, including optimized strategy parameters.

Figure 22:
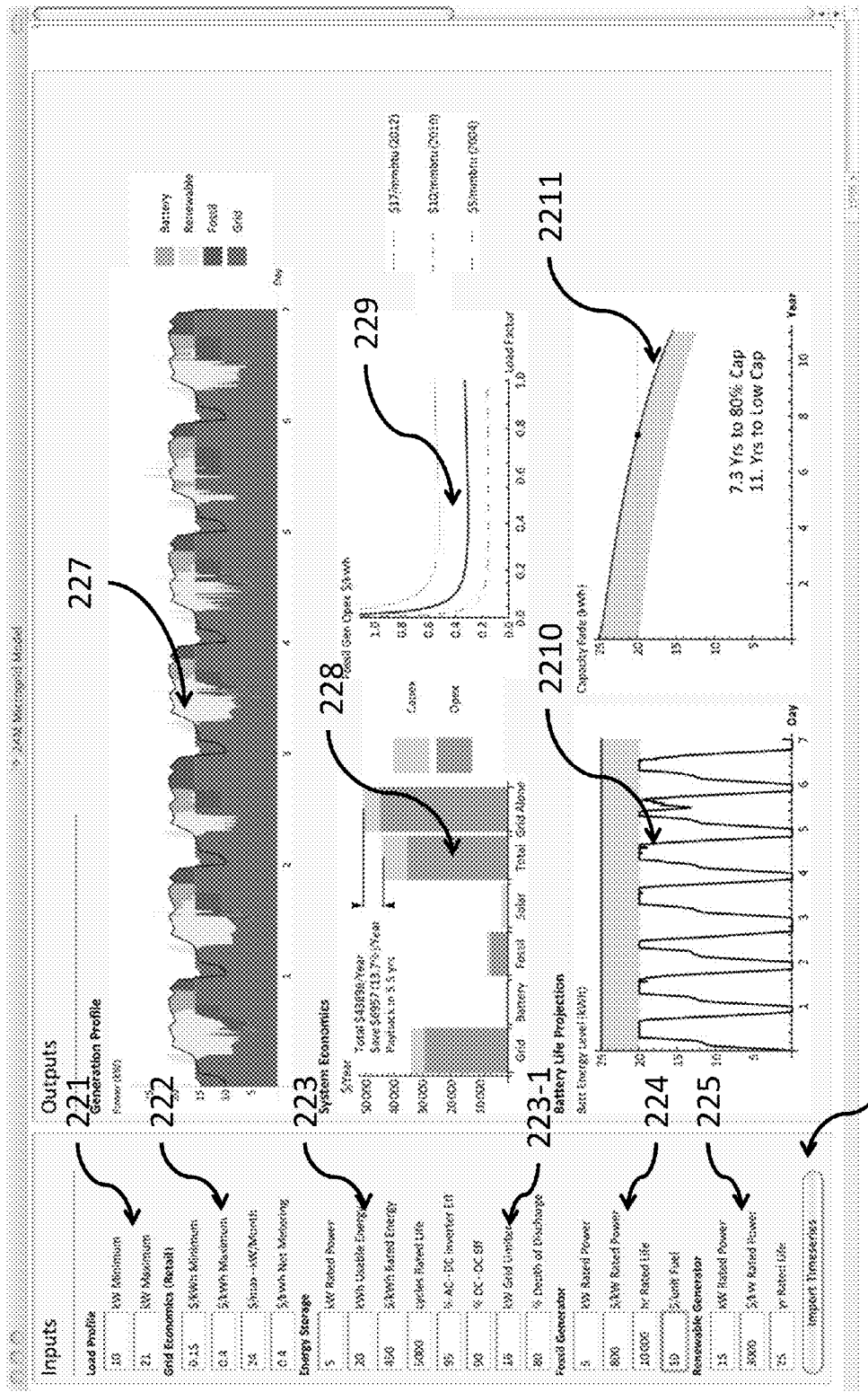
FIG. 22 shows an exemplary embodiment of the graphical interface of the micro-grid optimization tool.

FIG. 22 shows an exemplary embodiment of the graphical interface of the micro-grid optimization tool. Panel 221 can control scaling of maximum and minimum load; Panel 222 can control scaling of energy rates, peak demand charges and net metering payments; Panel 223 can control ESS size, life and economics and entry 223-1 controls maximum grid absorption; Panel 224 can control on-site fossil-fuel generator sizes, life and economics; Panel 225 can control renewable generator size, life and economics; Button 226 can import expected load profiles, renewable energy generation and energy rates; Graph 227 shows granular dispatch of micro-grid assets; Graph 228 shows capital and operating costs broken by asset and comparison with cost benchmark for energy savings and payback calculation; Graph 229 shows a fossil-fuel generator efficiency curve; Graph 2210 shows a granular evolution of ESS state of charge; Graph 2211 shows projected ESS degradation over time calculated from ESS physical models.

In some embodiments in all of the interfaces shown, the user can independently vary the inputs shown, whereupon the model can recalculate and present a revised set of graphs and calculations based on the changed input. This recalculation process can be near instantaneous.

The aforementioned examples are just some of the methodology and tools for optimal planning of energy storage systems. In general, each individual ES application can simulate ESS performance and profitability based on historical and forecast data and can therefore provide decision makers with an optimal estimate as of which ESS to deploy. Embodiments can also run in real time and evaluate the financial benefits of serving either one application in the foreseeable future, based on forecast data produced by state-of-the-art algorithms such as neural networks, bagged decision trees and others, which are known to those skilled in the art.

Figure 23:
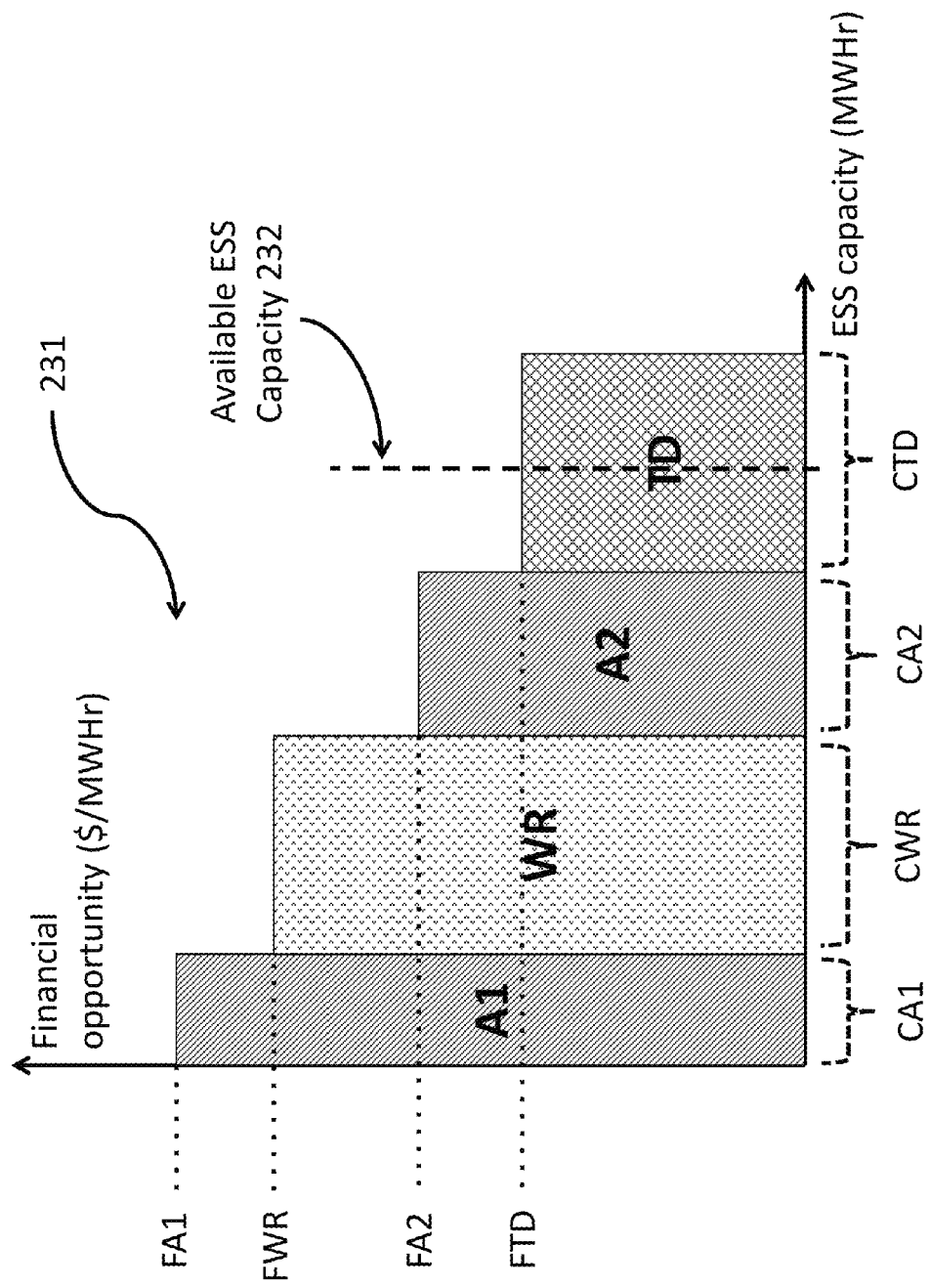
FIG. 23 is an exemplary representation of the dispatch stack of simultaneous ES applications.

ES applications can be subsequently ordered by financial worth and size of the opportunity, as illustratively shown in FIG. 23. In this example, dispatch stack 231 consists of four ES applications: (i) arbitrage A1, (ii) wind regulation WR, (iii) arbitrage A2, and (iv) transformer deferral TD. For each ES application, embodiments of the system described herein can calculate the financial worth and the size of the opportunity with optimal ESS operation. For example, it was determined that ESS could capture financial opportunity FA1 from arbitrage A1 with optimal committed capacity CA1; likewise, ESS could capture financial opportunity FWR from wind regulation WR with optimal committed capacity CWR, financial opportunity FA2 from arbitrage A2 with optimal committed capacity CA2 and financial opportunity FTD from transformer deferral TD with optimal committed capacity CTD. ES applications can be ordered by descending financial worth, like illustratively shown in Dispatch stack 231. ES applications can then be dispatched in order up to Available ESS Capacity 232, which can be smaller than the sum of the optimal committed capacities of ES applications in the stack. This approach can provide the maximum financial returns from the available ESS capacity.

Figure 24A:
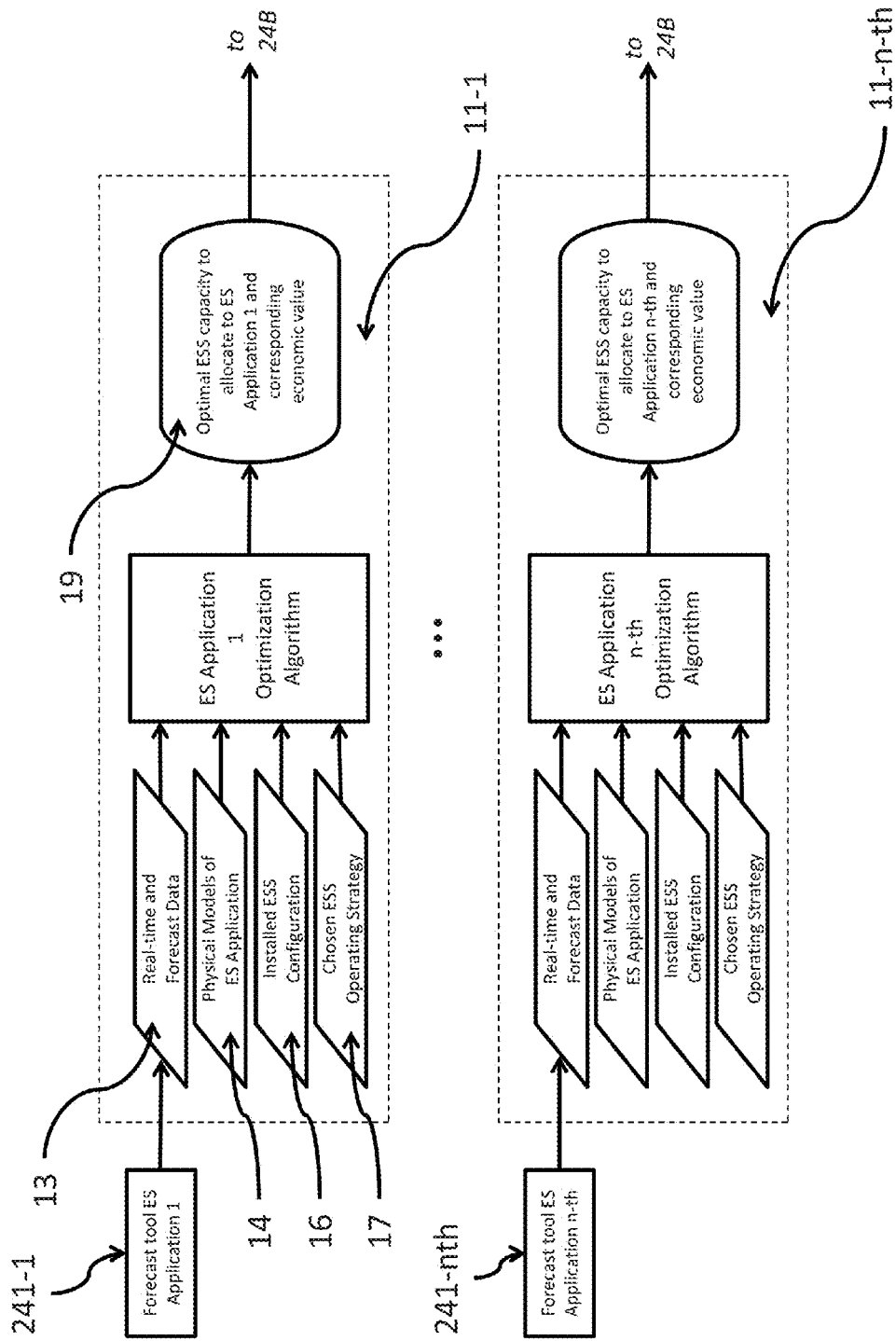
FIGS. 24A and 24B are exemplary schematics of one embodiment of Real-time Dispatch and Control of Simultaneous ES applications.
Figure 24B:
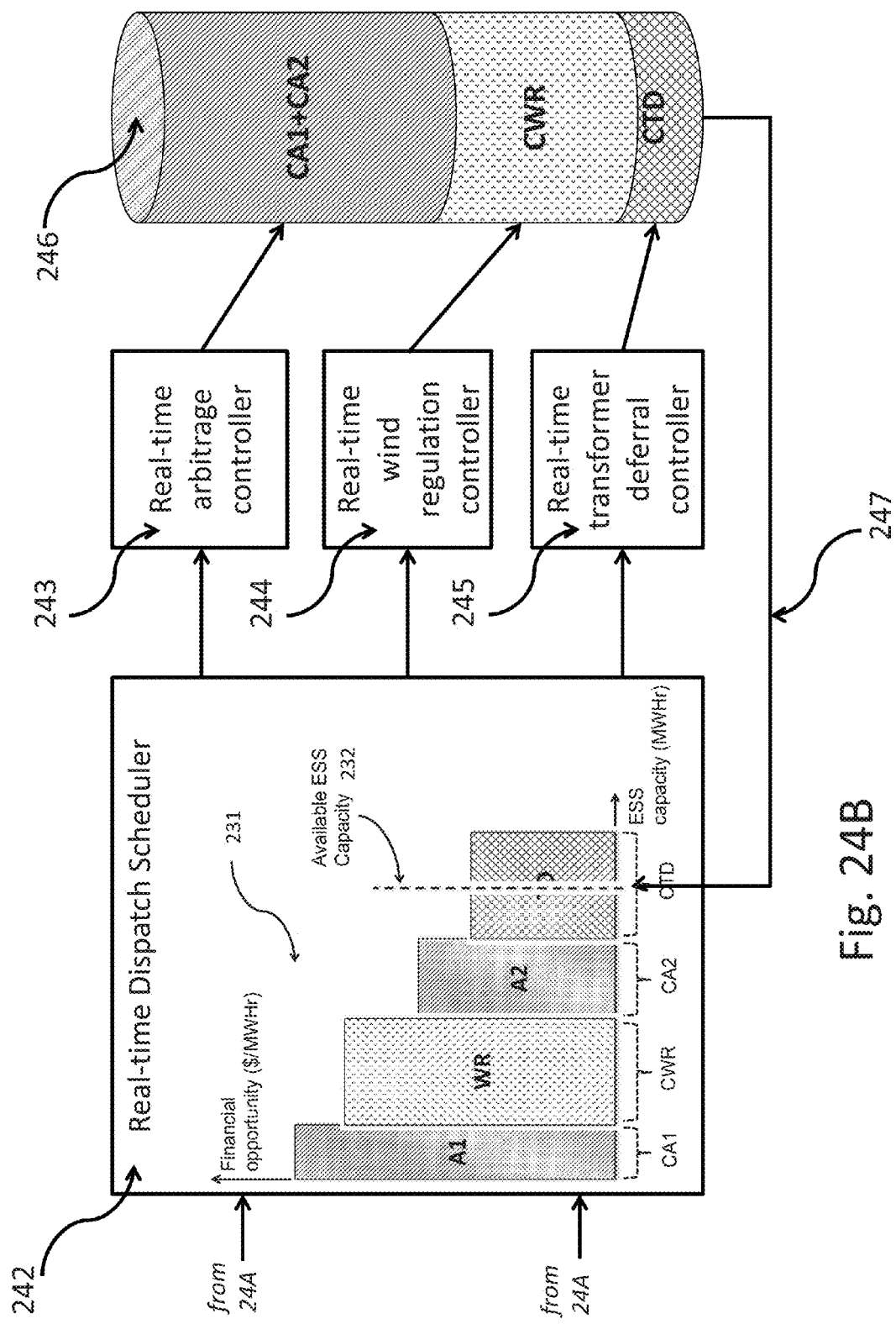

FIGS. 24A and B illustratively show one embodiment of real-time operation of an energy storage system. In an embodiment, the techniques described herein can be used to provide real-time control of the energy storage system using forecasted data, rather than historical data, though other data can be used. For example, a standard control system can receive forecasted data inputs, calculate the optimal operating strategy for an energy storage system, and then cause the energy storage system to operate in accord with the calculated optimal strategy. The control system can be configured such that it recalculates in real-time the optimal operating strategy on a predefined interval, or as new forecast data are received.

ES application optimization tools 11-1 through 11-*n*-th, where n-th is a generic number, can receive input from dedicated forecast tools 241-1 through 241 *n*-th and compute in real-time the optimal financial worth and committed capacity for ES applications 1 through n-th. These results can then be sorted by real-time dispatch scheduler 242 in dispatch stack 231, which can be dynamically updated in real-time. It should be noted that other operational constraints can occasionally prevent a specific ES application from being dispatched; alternatively, other operational requirements can lead to the dispatch of a specific ES application, even if it is not the most profitable. Therefore, real-time dispatch stack 231 can account for all these contingencies.

According to 231, controllers 243, 244 and 245 can respectively be allocated ESS capacities of generic names CA1, CA2, CWR and CTD (up to available ESS capacity 232) to dispatch in the time horizon of corresponding ES applications. These controllers can have a significant degree of intelligence in determining how to optimally dispatch the allocated capacity. Their real-time operation can also be fully parameterized by allocated capacity as well as ESS operational constraints, so that they can always immediately adapt current dispatch strategy to changing dispatch stack and other contingencies. Available ESS capacity 232 can be constantly fed back to real-time dispatch scheduler 242 via feedback link 247. In this specific example, it is assumed that arbitrage applications A1 and A2 can be fulfilled by the same controller, however this does not need to be the case.

Real-time controllers can enact any optimal ESS operating strategies, including, but not limited to, the ones illustrated in FIG. 4, FIG. 9, FIG. 15, FIG. 18 and FIG. 21. By way of example, an optimal controller for transformer deferral can implement the following algorithm:
  a. Calculate accelerated wear of windings insulation for given forecast load and ambient temperature;
  b. Quantify relative wear for each overload peak;
  c. Identify periods of time when transformer is not overloaded and ESS recharge is possible (Recharge Periods 178 and 179 in FIG. 17);
  d. Identify idle times when no ESS operation is permitted;
  e. Calculate optimal allocation of available capacity to mitigate overload peaks in such a way that minimizes transformer wear, while respecting ESS operational constraints (such as maximum and minimum capacity throughout the 48-hour period);
  f. Maximum and minimum capacity and other operational constraints can be specified for the time horizon of an ES application and can be updated dynamically as a function of external conditions (such as the capacity allocated by Real Time Dispatch Scheduler 232) as well as internal conditions (such as outage of ESS hardware);
  g. Many optimization strategies can be used to carry out the calculations in (e.), including linear and non-linear programming, as it will appear to those skilled in the art;
  h. The algorithm can re-compute all quantities periodically and possibly at each time step, in order to always enact the optimal strategy.

Figure 25:
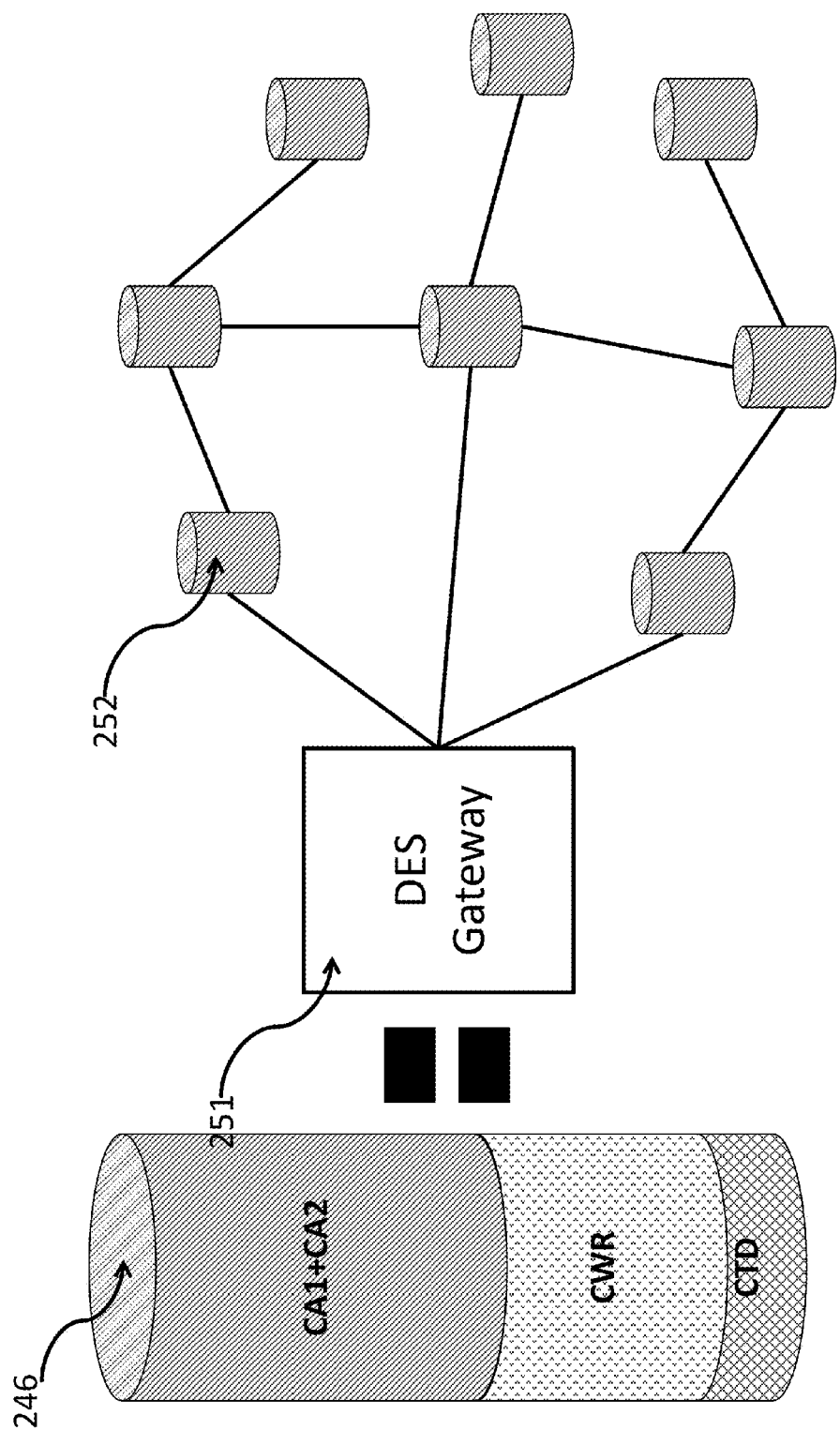
FIG. 25 illustrates an exemplary equivalence of centralized and distributed storage.

For the purpose of this description, it should be noted that the ESS available capacity does not need to be embodied in a single physical device. Distributed deployment, where applicable, can provide additional benefits because it enables more granular power and energy services, such as protection of neighborhood transformers or assistance with electric vehicle charging stations. FIG. 25 illustratively shows the equivalence of ESS 246 and a network of ESS 252, in communication and coordination via distributed energy storage (DES) Gateway 251. Likewise, each of ESS 252 can be a network of subunits, each one of which can adopt ES application prioritization processes and dispatch stack. Thus, embodiments can apply to each level of a multi-layer ESS infrastructure in a way that maximizes global as well as local performance metrics such as profitability, reliability, accessibility, etc.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in a non-transitory information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non-volatile memory, including by way of example semiconductor memory devices, (e.g., erasable programmable read-only memory (EPROM), electrically erasable programmable read-only memory (EEPROM), and flash memory devices); magnetic disks, (e.g., internal hard disks or removable disks); magneto optical disks; and optical disks (e.g., compact discs (CDs) and digital versatile discs (DVDs). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), or a touchscreen, by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

The foregoing has been a detailed description of illustrative embodiments of the invention. Various modifications and additions can be made without departing from the spirit and scope of this invention. Each of the various embodiments described above may be combined with other described embodiments in order to provide multiple features. Furthermore, while the foregoing describes a number of separate embodiments of the methodology and tools of the present invention, what has been described herein is merely illustrative of the application of the principles of the present invention. For example, the appearance, the features, the inputs and outputs and the mathematical algorithms of components described herein can be varied to suit a particular application. Accordingly, this description is meant to be taken only by way of example, and not to otherwise limit the scope of this invention.

To the extent certain functionality or components "can" or "may" be performed or included, respectively, the identified functionality or components are not necessarily required in all embodiments, and can be omitted from certain embodiments of the invention.

To the extent that the foregoing description refers to the "invention," the present disclosure may include more than one invention.

What is claimed is:

1. A computerized method for controlling balancing services based on a combination of an energy storage system and reserves using a computer, the method comprising:
   receiving at the computer a first physical model relating to a rate of degradation of the energy storage system;
   retrieving from a first database, using the computer, first historical data relating to historical renewable energy generation;
   retrieving from a second database, using the computer, second historical data relating to historical forecast error;
   receiving at the computer one or more possible configurations for the energy storage system;
   receiving at the computer a cost model for the energy storage system;
   receiving at the computer information relating to a cost of providing the reserves;
   receiving at the computer one or more possible operating strategies of the energy storage system for minimizing a cost of the balancing services,
      wherein the one or more possible operating strategies are computed via
         calculating, using the computer, a renewable energy power supply commitment based on forecasted renewable energy generation and user defined renewable energy power shaping requirements; and
         calculating, using the computer, a difference between the calculated renewable energy power supply commitments and real-time renewable energy generation,
         wherein the renewable energy power supply commitment comprises a plurality of power block commitments, each of the power block commitments being characterized by a duration, a slope, and a jump from an adjacent power block commitment, and
         the user defined renewable energy power shaping requirements comprise a maximum allowed slope and a maximum allowed jump from an adjacent power block commitment for the power block commitments;
   receiving at the computer a second physical model relating to forecast uncertainty;
   calculating, using the computer, an optimal combination of the energy storage system and the reserves that minimizes a cost of balancing the difference based on the first historical data, the second historical data, the first and second physical models, the information relating to a cost of providing the reserves, the one or more possible energy storage system configurations, the one or more possible energy storage system operating strategies, and the cost model; and
   charging or discharging, using a controller, an energy storage asset of the energy storage system in accordance with the calculated optimal combination of the energy storage system and the reserves.

2. The computerized method of claim 1, wherein the renewable energy generation comprises wind power generation.

3. The computerized method of claim 1, wherein the one or more possible energy storage system configurations comprise at least one of capacity information, power rating information, charge rate information, discharge rate information, efficiency loss information, and useful life information.

4. The computerized method of claim 1, wherein the step of calculating the optimal combination of the energy storage system and the reserves comprises using at least one of a list comparison, a multivariate regression technique, a local optimization technique, linear programming, non-linear programming, a Monte Carlo optimization, a machine learning technique, a regression fitting technique, and a multivariate optimization technique.

5. The computerized method of claim 1, further comprising calculating, using the computer, at least one of an optimal energy storage system capacity, an optimal energy storage system operating strategy, and a financial metric for the energy storage system based on simulation of the one or more possible energy storage system configurations and the one or more possible energy storage system operating strategies.

6. A system for controlling balancing services based on a combination of an energy storage system and reserves, the system comprising:
   a first database;
   a second database;
   a computer configured to:
      receive a first physical model relating to a rate of degradation of the energy storage system;

retrieve from the first database first historical data relating to historical renewable energy generation;

retrieve from the second database second historical data relating to historical forecast error;

receive one or more possible configurations for the energy storage system;

receive a cost model for the energy storage system;

receive information relating to a cost of providing the reserves;

receive one or more possible operating strategies of the energy storage system for minimizing a cost of the balancing services, wherein the one or more possible operating strategies are computed via calculating a renewable energy power supply commitment based on forecasted renewable energy generation and user defined renewable energy power shaping requirements; and calculating a difference between the calculated renewable energy power supply commitments and real-time renewable energy generation, wherein the renewable energy power supply commitment comprises a plurality of power block commitments, each of the power block commitments being characterized by a duration, a slope, and a jump from an adjacent power block commitment, and the user defined renewable energy power shaping requirements comprise a maximum allowed slope and a maximum allowed jump from an adjacent power block commitment for the power block commitments;

receive a second physical model relating to forecast uncertainty; and calculate an optimal combination of the energy storage system and the reserves that minimizes a cost of balancing the difference based on the first historical data, the second historical data, the first and second physical models, the information relating to a cost of providing the reserves, the one or more possible energy storage system configurations, the one or more possible energy storage system operating strategies, and the cost model; and a controller configured to charge or discharge an energy storage asset of the energy storage system in accordance with the calculated optimal combination of the energy storage system and the reserves.

7. The system of claim 6, wherein the renewable energy generation comprises wind power generation.

8. The system of claim 6, wherein the one or more possible energy storage system configurations comprise at least one of capacity information, power rating information, charge rate information, discharge rate information, efficiency loss information, and useful life information.

9. The system of claim 6, wherein the computer is further configured to calculate the optimal combination of the energy storage system and the reserves by using at least one of a list comparison, a multivariate regression technique, a local optimization technique, linear programming, non-linear programming, a Monte Carlo optimization, a machine learning technique, a regression fitting technique, and a multivariate optimization technique.

10. The system of claim 6, wherein the computer is further configured to calculate at least one of an optimal energy storage system capacity, an optimal energy storage system operating strategy, and a financial metric for the energy storage system based on simulation of the one or more energy storage system configurations and the one or more possible energy storage system operating strategies.

11. A non-transitory computer readable medium having stored thereon executable code which causes a computer to perform a method for controlling balancing services based on a combination of an energy storage system and reserves, the method comprising:

receiving at the computer a first physical model relating to a rate of degradation of the energy storage system;

retrieving from a first database, using the computer, first historical data relating to historical renewable energy generation;

retrieving from a second database, using the computer, second historical data relating to historical forecast error;

receiving at the computer one or more configurations for the energy storage system;

receiving at the computer a cost model for the energy storage system;

receiving at the computer information relating to a cost of providing the reserves;

receiving at the computer one or more possible operating strategies of the energy storage system for minimizing a cost of the balancing services, wherein the one or more possible operating strategies are computed via calculating, using the computer, a renewable energy power supply commitment based on forecasted renewable energy generation and user defined renewable energy power shaping requirements; and calculating, using the computer, a difference between the calculated renewable energy power supply commitments and real-time renewable energy generation;

wherein the renewable energy power supply commitment comprises a plurality of power block commitments, each of the power block commitments being characterized by a duration, a slope, and a jump from an adjacent power block commitment, and the user defined renewable energy power shaping requirements comprise a maximum allowed slope and a maximum allowed jump from an adjacent power block commitment for the power block commitments;

receiving at the computer a second physical model relating to forecast uncertainty;

calculating, using the computer, an optimal combination of the energy storage system and the reserves that minimizes a cost of balancing the difference based on the first historical data, the second historical data, the first and second physical models, the information relating to a cost of providing the reserves, the one or more possible energy storage system configurations, the one or more possible energy storage system operating strategies, and the cost model; and charging or discharging, using a controller, an energy storage asset of the energy storage system in accordance with the calculated optimal combination of the energy storage system and the reserves.

12. The computer readable medium of claim 11, wherein the renewable energy generation comprises wind power generation.

13. The computer readable medium of claim 11, wherein the one or more possible energy storage system configurations comprise at least one of capacity information, power rating information, charge rate information, discharge rate information, efficiency loss information, and useful life information.

14. The computer readable medium of claim 11, wherein the step of calculating the optimal combination of the energy storage system and the reserves comprises at least one of a list comparison, a multivariate regression technique, a local optimization technique, linear programming, non-linear programming, a Monte Carlo optimization, a machine learning technique, a regression fitting technique, and a multivariate optimization technique.

15. The computer readable medium of claim 11, wherein the method further comprises calculating, using the computer, at least one of an optimal energy storage system capacity, an optimal energy storage system operating strategy, and a financial metric for the energy storage system based on simulation of the one or more possible energy storage system configurations and the one or more possible energy storage system operating strategies.

* * * * *